(12) United States Patent
Thangaraj et al.

(10) Patent No.: US 10,169,804 B2
(45) Date of Patent: Jan. 1, 2019

(54) METHODS AND SYSTEMS FOR TRANSPORTATION SERVICE RECOMMENDATION

(71) Applicant: Conduent Business Services, LLC, Dallas, TX (US)

(72) Inventors: Raja Subramaniam Thangaraj, Kulithalai (IN); Gurulingesh Raravi, Bangalore (IN); Koyel Mukherjee, Bangalore (IN); Asmita Metrewar, Nanded (IN); Partha Dutta, Bangalore (IN)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 27 days.

(21) Appl. No.: 15/018,956

(22) Filed: Feb. 9, 2016

(65) Prior Publication Data
US 2017/0227367 A1    Aug. 10, 2017

(51) Int. Cl.
*G06Q 30/06* (2012.01)
*G01C 21/34* (2006.01)
(Continued)

(52) U.S. Cl.
CPC ......... *G06Q 30/0631* (2013.01); *G01C 21/20* (2013.01); *G01C 21/34* (2013.01);
(Continued)

(58) Field of Classification Search
CPC .. G06Q 30/0631; G06Q 50/30; G06Q 10/047; G06Q 10/025; G01C 21/3423; G01C 21/34; G01C 21/3446; G01C 21/20
See application file for complete search history.

(56) References Cited

U.S. PATENT DOCUMENTS 5,021,953 A   6/1991  Webber et al.
6,622,084 B2  9/2003  Cardno et al.
(Continued)

OTHER PUBLICATIONS

Sharing Rides with Friends: a coalition Formation Algorithm for Ridesharing, Flippo Bistaffa, Alessandro Farinelli and Sarvapali D. Ramchurn, In AAAI Conference on Artificial Intelligence 2015.
(Continued)

*Primary Examiner* — Jeffrey C Boomer
(74) *Attorney, Agent, or Firm* — Jones Robb, PLLC

(57) ABSTRACT

According to embodiments illustrated herein there is provided a method for transportation service recommendation. The method includes determining, one or more routes between a first location and a second location. The method further includes identifying one or more transportation services between each pair of adjacent intermediate nodes of a plurality of intermediate nodes, of the one or more routes. A pre-initiated pooled transportation service for at least a first pair of adjacent intermediate nodes, and a public transportation for at least a second pair of adjacent intermediate nodes are identified. The method further includes determining a likelihood to find one or more other users on a route at least between the first pair of adjacent intermediate nodes, if a user initiates a new-pooled transportation service in an event of unavailability of the pre-initiated pooled transportation service. Additionally, the method includes transmits one or more transportation service recommendations to the user.

23 Claims, 10 Drawing Sheets

(51) Int. Cl.
*G06Q 10/02* (2012.01)
*G01C 21/20* (2006.01)
*G06Q 10/04* (2012.01)
*G06Q 50/30* (2012.01)

(52) U.S. Cl.
CPC ..... *G01C 21/3423* (2013.01); *G01C 21/3446* (2013.01); *G06Q 10/025* (2013.01); *G06Q 10/047* (2013.01); *G06Q 50/30* (2013.01)

(56) References Cited

U.S. PATENT DOCUMENTS

| | | | |
|---|---|---|---|
| 7,062,376 B2 | 6/2006 | Oesterling | |
| 9,228,841 B2 | 1/2016 | Dutta et al. | |
| 2003/0177020 A1* | 9/2003 | Okamura | G06Q 10/02 705/5 |
| 2004/0049424 A1 | 3/2004 | Murray et al. | |
| 2008/0195428 A1* | 8/2008 | O'Sullivan | G06Q 10/00 705/6 |
| 2010/0324950 A1* | 12/2010 | Merriam | G06Q 10/043 705/7.11 |
| 2011/0184640 A1* | 7/2011 | Coleman | G01C 21/3492 701/533 |
| 2012/0078672 A1* | 3/2012 | Mohebbi | G06Q 10/0631 705/7.12 |
| 2013/0024249 A1* | 1/2013 | Zohar | G06Q 10/06 705/13 |
| 2013/0103313 A1* | 4/2013 | Moore | G01C 21/20 701/533 |
| 2013/0262222 A1* | 10/2013 | Gibson | G06Q 10/025 705/14.49 |
| 2014/0139359 A1* | 5/2014 | Paul | G08G 1/141 340/932.2 |
| 2014/0257697 A1 | 9/2014 | Gishen | |
| 2015/0345951 A1* | 12/2015 | Dutta | G01C 21/3605 701/400 |
| 2016/0187151 A1* | 6/2016 | Barbieri | G01C 21/3446 701/540 |
| 2016/0298977 A1* | 10/2016 | Newlin | G01C 21/3423 |
| 2016/0364679 A1* | 12/2016 | Cao | G06Q 10/083 |
| 2017/0026786 A1* | 1/2017 | Barron | H04W 4/021 |
| 2017/0059334 A1* | 3/2017 | Mukherjee | G01C 21/34 |
| 2017/0191845 A1* | 7/2017 | Marueli | G01C 21/3484 |

OTHER PUBLICATIONS

T-share: A large-scale dynamic taxi ridesharing service, Shuo Ma, Yu Zheng and Ouri Wolfson, In 29th IEEE International Conference on Data Engineering (ICDE), 2013.

* cited by examiner

METHODS AND SYSTEMS FOR TRANSPORTATION SERVICE RECOMMENDATION

TECHNICAL FIELD

The presently disclosed embodiments are related, in general, to transportation services. More particularly, the presently disclosed embodiments are related to methods and systems for transportation service recommendation.

BACKGROUND

Travel management systems of current day have led to the development of online platforms that may cater various travelling requirements of a user. Usually, such systems provide a travelling solution comprising public transportation services or private transportation services based on user preferences.

Public transportation services usually comply with the schedule that has been set by the owner of the public transportation service. Therefore, in certain scenarios, the public transportation services may not comply with the user's preference such as travel time. On the other hand, the private transportation service may exceed the cost constraint of the user.

SUMMARY

According to embodiments illustrated herein there is provided a method of transportation service recommendation. The method includes determining, by one or more processors, one or more routes between the first location and the second location, wherein each of the one or more routes comprises a plurality of intermediate nodes. The method further includes identifying, by the one or more processors, one or more transportation services between each pair of adjacent intermediate nodes of the plurality of intermediate nodes, based at least on a user profile, wherein a pre-initiated pooled transportation service is identified for at least a first pair of adjacent intermediate nodes, and wherein a public transportation service is identified for at least a second pair of adjacent intermediate nodes. The method further includes determining, by the one or more processors, a likelihood to find one or more other users on a route at least between the first pair of adjacent intermediate nodes, if a user initiates a new-pooled transportation service in an event of unavailability of the pre-initiated pooled transportation service. In addition, the method includes transmitting, by the one or more processors, one or more transportation service recommendations to the user through a user-computing device, wherein the one or more transportation service recommendations comprise the one or more routes and the corresponding one or more transportation services.

According to embodiments illustrated herein there is provided a system for transportation service recommendation. The system includes one or more processors configured to determine one or more routes between the first location and the second location, wherein each of the one or more routes comprises a plurality of intermediate nodes. The system further includes the one or more processors configured to identify one or more transportation services between each pair of adjacent intermediate nodes of the plurality of intermediate nodes, based at least on a user profile, wherein a pre-initiated pooled transportation service is identified for at least a first pair of adjacent intermediate nodes, and wherein a public transportation service is identified for at least a second pair of adjacent intermediate nodes. The system further includes the one or more processors configured to determine a likelihood to find one or more other users on a route at least between the first pair of adjacent intermediate nodes, if a user initiates a new-pooled transportation service in an event of unavailability of the pre-initiated pooled transportation service. In addition, the system includes the one or more processors configured to transmit one or more transportation service recommendations to the user through a user-computing device, wherein the one or more transportation service recommendations comprise the one or more routes and the corresponding one or more transportation services.

According to embodiments illustrated herein there is provided a computer program product for use with a computer, the computer program product comprising a non-transitory computer readable medium, wherein the non-transitory computer readable medium stores a computer program code for transportation service recommendation. The computer program code is executable by one or more processors to determine one or more routes between the first location and the second location, wherein each of the one or more routes comprises a plurality of intermediate nodes. The computer program code is further executable by the one or more processors to identify one or more transportation services between each pair of adjacent intermediate nodes of the plurality of intermediate nodes, based at least on a user profile, wherein a pre-initiated pooled transportation service is identified for at least a first pair of adjacent intermediate nodes, and wherein a public transportation service is identified for at least a second pair of adjacent intermediate nodes. The computer program code is further executable by the one or more processors to determine a likelihood to find one or more other users on a route at least between the first pair of adjacent intermediate nodes, if a user initiates a new-pooled transportation service in an event of unavailability of the pre-initiated pooled transportation service. Finally, the computer program code is executable by the one or more processors to transmit one or more transportation service recommendations to the user through a user-computing device, wherein the one or more transportation service recommendations comprise the one or more routes and the corresponding one or more transportation services.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
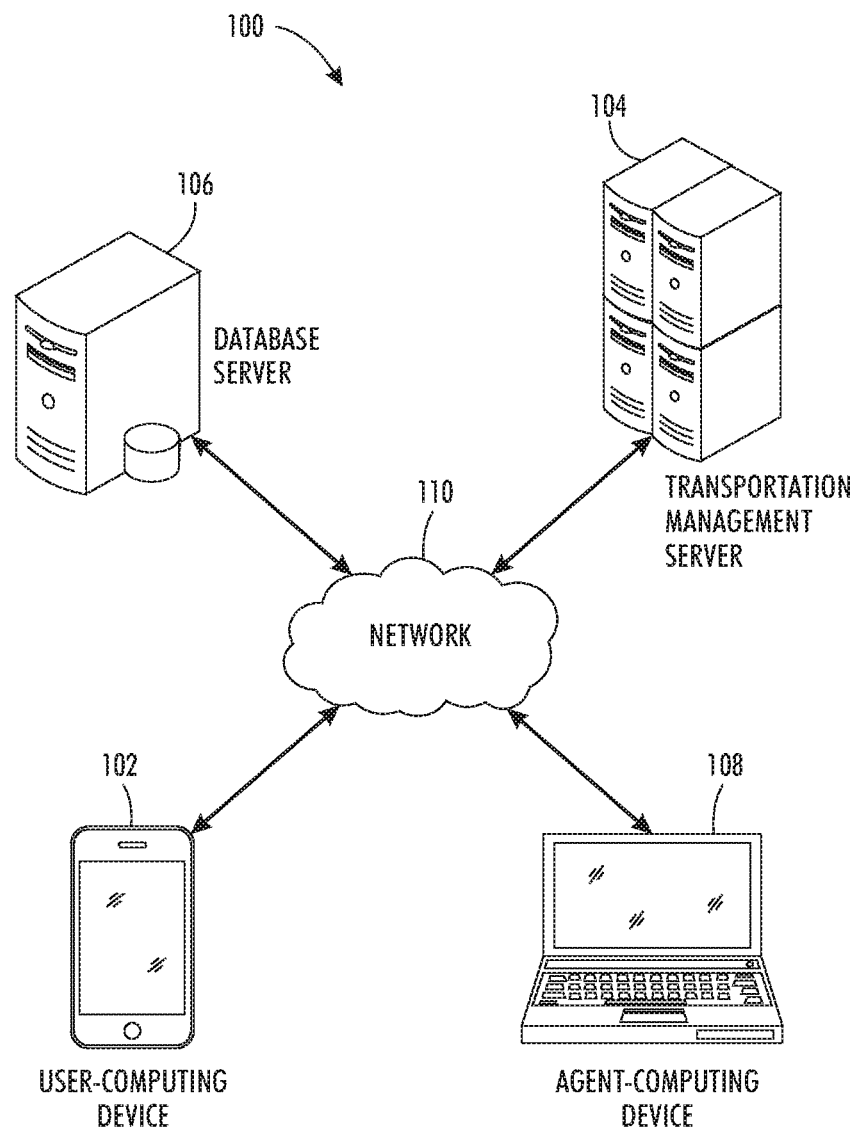
FIG. 1 is a block diagram illustrating a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions

The following terms shall have, for the purposes of this application, the respective meanings set forth below.

A "user-computing device" may correspond to a computer, a device including a processor/microcontroller and/or any other electronic component, device or system that performs one or more operations to one or more programming instructions. Examples of the user-computing device include, but are not limited to, a desktop computer, a laptop, a personal digital assistant (PDA), a smartphone, or the like. The user-computing device may be GPS enabled and capable of accessing (or being accessed over) a network (e.g., using wired or wireless communication capabilities). In an embodiment, the user-computing device may present a graphical user interface (GUI) to a user. The user-computing device may display transportation service recommendations to the user through the GUI.

A "transportation service" may correspond to a means of transport that may allow a user to travel along one or more routes. In an embodiment, the transportation service may correspond to a public transportation service, a pooled transportation service, private transportation service, and the like.

"Transportation service recommendations" may correspond to one or more routes and corresponding one or more transportation services recommended to a user based on a request from the user. The one or more routes and the corresponding one or more transportation services may be identified based on one or more route preferences and one or more transportation service preferences specified by the user. In an embodiment, the transportation service recommendations may be ranked based on one or more route parameters and one or more transportation service parameters associated with the one or more routes and the corresponding one or more transportation services.

"Route preferences" may correspond to preferences for routes between a first location and a second location. For example, the route preferences may include a preference of the route between the first location and the second location, a maximum number of intermediate hops between the first location and the second location, a maximum detour threshold, and a maximum walking threshold.

A "maximum detour threshold" may correspond to a maximum allowable deviation from a shortest path between a first location and a second location. In an embodiment, the user may specify the maximum detour threshold to discard one or more routes between the first location and the second location with deviation greater than the maximum detour threshold. For example, the shortest path between the first location "A" and the second location "B" is of 10 km. If the user specifies the maximum detour threshold as 2 km, one or more routes between the first location and the second location that have a distance greater than 12 km are rejected.

A "maximum walking threshold" may correspond to a maximum distance a user prefers to walk while travelling between a first location and a second location. In an embodiment, the user may specify the maximum walking threshold to discard one or more routes between the first location and the second location with walking distance greater than the maximum walking threshold. For example, a first route "X" between the first location "A" and the second location "B" has a walking leg of 1 km and a second route "Y" has between the first location "A" and the second location "B" has a walking leg of 2 km. If the user specifies the maximum walking threshold as 1 km, the second route "Y" is discarded.

"Transportation service preferences" may correspond to preferences specified by a user that comprise a preference of a transportation service, a preference of make of the transportation service, a maximum occupancy of pooled transportation service, a cost constraint, and a preference of co-passengers in the pooled transportation service.

A "cost constraint" may correspond to an upper bound on cost of travel as specified by a user. For example, the user may specify a maximum cost that the user can bear to travel from a first location to a second location. In such a scenario, the maximum cost specified by the user refers to the cost constraint.

A "preferred time of travel" may correspond to a specific time interval during a day during which a user wants to travel. For example, a user travels from a first location to a second location between 5 PM and 6 PM from Monday to Friday. In such scenario, the interval between 5 PM and 6 PM refers to the preferred time of travel.

A "first location" may correspond to a source location from which the user may wish to start his/her travel to reach a destination location. In an embodiment, the user may have an option to opt for a route from one or more routes between the source location and the destination location. For example, if the user wants to travel from location "A" to location "B", location "A" corresponds to the first location. In an embodiment, the first location may correspond to a pick-up location of the user.

A "second location" may correspond to a destination location that a user may wish to reach from a first location through one or more routes. For example, if the user wants to travel from location "A" to location "B", location "B" corresponds to the second location. In an embodiment, the second location may correspond to a drop location of the user.

A "first request" may correspond to a request by a user associated with a user-computing device for receiving one or more transportation service recommendations. In an embodiment, the first request comprises a first location, a second location, and a preferred time of travel. For example, a user may input a request to receive transportation service recommendations between a location "A" and a location "B" on "Dec. 23, 2015, 6:45 am". In this scenario, the request corresponds to the first request.

"Intermediate nodes" may correspond to one or more intermediate locations traversed by a user while travelling between a source location and a destination location. For example, if the user travels from the source location "A to the destination location "C" via an intermediate location "B", the intermediate location "B" corresponds to the intermediate node.

A "pooled transportation service" may correspond to a pooled transportation service reserved by a user to travel from a first location to a second location. For example, the user reserves the pooled transportation service to travel from location "A" to location "B". In an embodiment, the pooled transportation service may be availed by other users, i.e., the user and the other user may use the same vehicle to travel between location A and location B. Further, the cost of travel between the location A and the location B is shared among the user and the other users.

A "pre-initiated pooled transportation service" may correspond to a pooled transportation service, which is already initiated by a first user that may be availed by a second user. In an embodiment, for the second user, the pooled transportation service may correspond to the pre-initiated pooled transportation service. For example, a first user submits a first request at 10 AM on Mar. 20, 2015. The first request may correspond to initiate a pooled transportation service between a first location and a second location at 12 PM on Mar. 20, 2015. The second user submits a second request for a transportation service recommendation between the first location and the second location at 12 AM on Mar. 20, 2015. The second user receives a recommendation to travel on the pooled transportation service initiated by the first user. In such a case, the pooled transportation service corresponds to the pre-initiated pooled transportation service.

A "new-pooled transportation service" may correspond to a pooled transportation service, which is initiated by any user. For example, a first user submits a first request at 10 AM on Mar. 20, 2015. The first request may correspond to initiate a pooled transportation service between a first location and a second location at 12 PM on Mar. 20, 2015. The pooled transportation service corresponds to the new-pooled transportation service.

A "public transportation service" may correspond to a transport service, which is available for use by the general public. In an embodiment, the public transportation service may ply on a predefined route according to a predefined schedule. In an embodiment, the complete cost of availing the public transportation service is borne by the user. For example, the user wishes to use public transportation service to travel from location A to location B, the user has to bear the complete cost of the travelling from the location A to location B. Examples of public transportation service may include buses, trains, metro, trams, and the like.

A "user profile" may correspond to a profile associated with a user that includes one or more preferences pertaining to user's requirements. In an embodiment, the user profile may be created by the user at the time of registration for a service. In an embodiment, the user profile may comprise route preferences and transportation service preferences as specified by the user.

"One or more route parameters" may refer to one or more parameters associated with one or more routes. The one or more route parameters comprise at least a number of intermediate hops in the one or more routes, a distance of walking leg in the one or more routes, and a detour distance from the shortest path between the first location and the second location in the one or more routes. In an embodiment, the one or more routes may be ranked based on the one or more route parameters associated with the one or more routes. For example, a first route with two intermediate hops will have a better rank compared with a second route with three intermediate hops. Similarly a first route with a walking length of 200 m may be considered superior to a second route with a walking length of 500 m.

"One or more transportation service parameters" may refer to one or more parameters associated with one or more transportation services. The one or more transportation service parameters comprise a travel time information, and the price charged by the corresponding one or more transportation services. In an embodiment, the one or more transportation services may be ranked based on the one or more transportation service parameters associated with the one or more transportation services. For example, a first transportation service that takes 10 minutes to travel from A to B may be considered better than a second transportation service that takes 15 minutes to travel from A to B. Similarly, the first transportation service charging $1 for travelling from A to B may be considered better than the second transportation service charging $2 for travelling from A to B.

A "likelihood" shall be broadly construed, to include any calculation of likelihood; approximation of likelihood, using any type of input data, regardless of precision or lack of precision; any number, either calculated or predetermined, which simulates a likelihood; or any method step having an effect of using or finding some data having some relation to a likelihood.

A "real time data" may correspond to live traffic data received by sensors on one or more routes during preferred time of travel. In an embodiment, the real time data may correspond to availability of the one or more routes. For example, a route 1 may not be available for travelling due to an ongoing construction on the route. In this scenario, the information pertaining to the availability of the route may correspond to the real time data.

"Historical data" may correspond to statistical data of traffic conditions on one or more routes. In an embodiment, the historical data may comprise information pertaining to average vehicle density on the one or more travelling routes at a specific interval of time during a day. In an embodiment, the historical data may be collected from various traffic tracking services known in the art.

An "agent-computing device" may correspond to a computer, a device including a processor/microcontroller and/or any other electronic component, device or system that performs one or more operations to one or more programming instructions. Examples of the agent-computing device include, but are not limited to, a desktop computer, a laptop, a personal digital assistant (PDA), a smartphone, or the like. The agent-computing device is GPS enabled and capable of accessing (or being accessed over) a network (e.g., using wired or wireless communication capabilities). In an embodiment, the agent-computing device may be associated with a service provider of a pooled transportation service. In another embodiment, the agent-computing device may be associated with a private transportation service owner, wherein the private transportation service owner has requested a server to find one or more users for pooling the private transportation service.

A "first mode" may correspond to a working mode of a computing device, such that while working in the first mode the computing device may determine a likelihood to find one or more other users, for a new-pooled transportation service, on a route. In an embodiment, the user may input the working mode of the computing device as the "first mode" in a first request.

A "second mode" may correspond to a working mode of a computing device, such that while working in the second mode the computing device may not identify any new-pooled transportation service in an event of unavailability of a pre-initiated transportation service on a route. In an embodiment, the user may input the working mode of the computing device as the "second mode" in a first request.

A "first notification" may refer to a notification transmitted to an agent-computing device associated with a service provider of pooled transportation service. The first notification may comprise one or more details pertaining to at least a pick up node of a first pair of adjacent intermediate nodes in a plurality of nodes in one or more routes, and information of the user. In an embodiment, the first notification may be transmitted to the agent-computing device when the user confirms a booking for the pooled transportation service associated with the agent-computing device.

A "second request" may refer to a request by a service provider of pooled transportation service to receive recommendations of the one or more routes on which the service provider should ply one or more pooled transportation services. In an embodiment, the second request may comprise a first location and a second location.

A "second notification" may refer to a notification transmitted to an agent-computing device associated with a service provider of pooled transportation service. The second notification may comprise one or more routes recommended to a service provider of pooled transportation service based on a demand for the pooled transportation service on the one or more routes. In an embodiment, the second notification may be transmitted in response to a request from the service provider of the pooled transportation service.

FIG. 1 is a block diagram illustrating a system environment 100 in which various embodiments may be implemented. The system environment 100 includes a user-computing device 102, a transportation management server 104, a database server 106, an agent-computing device 108, and a network 110.

In an embodiment, the user-computing device 102 may refer to a computing device used by a user. The user-computing device 102 may include one or more processors and one or more memories. The one or more memories may include computer readable code that may be executable by the one or more processors to perform one or more operations as specified by the user. In an embodiment, the user-computing device 102 may include one or more sensors, such as, but not limited to, a Global Positioning System (GPS) sensor, a compass, and a Wi-Fi sensor. In an embodiment, the user-computing device 102 may have communication capabilities that enable the user-computing device 102 to transmit/receive data and messages in accordance with one or more communication protocols such as, but are not limited to, FTP, WebDAV, E-Mail, SMB, NFS, and TWAIN.

In an embodiment, the user-computing device 102 may present a request interface (received from the transportation management server 104) that may enable the user to input a first request to travel from a first location to a second location at a preferred time of travel. In an embodiment, the user-computing device 102 may transmit the first request to the transportation management server 104. In an embodiment, the user-computing device 102 may transmit a location of the user along with the first request. In an embodiment, the location of the user corresponds to a pick-up location of the user. In an embodiment, the pick up location may further correspond to a current location of the user. In an embodiment, the user-computing device 102 may utilize a GPS sensor to determine the location of the user. In an embodiment, the user-computing device 102 may receive one or more transportation service recommendations from the transportation management server 104. The one or more transportation service recommendations may comprise one or more routes between the first location and the second location along with one or more transportation services on each of the one or more routes. In an embodiment, the user-computing device 102 may enable the user to select a transportation service recommendation from the one or more transportation service recommendations. In an embodiment, the user-computing device 102 may receive details pertaining to a service provider of a booked pooled transportation service transmitted by the transportation management server 104. Examples of the user-computing device 102 may include, but are not limited to, a personal computer, a laptop, a personal digital assistant, a mobile device, a tablet, or any other computing device. In an embodiment, the structure of the user-computing device 102 has been described later in conjunction with FIG. 3.

In an embodiment, the transportation management server 104 refers to a computing device or a software framework hosting an application or a software service configured to transmit the one or more transportation service recommendations to the user. In an embodiment, the transportation management server 104 may include a special purpose operating system specifically configured to perform one or more operations for transmitting the one or more transportation service recommendations to the user-computing device 102. The transportation management server 104 may include one or more processors and one or more memories. The one or more memories may include computer readable code that may be executable by the one or more processors to configure one or more transceivers to transmit the one or more transportation service recommendations to the user. Examples of the one or more operations for transmitting the one or more transportation service recommendations may comprise, but are not limited to, receiving a first request from a user, determining the one or more routes between the first location and the second location, and identifying the one or more transportation services on each of the one or more routes. In an embodiment, the transportation management server 104 may be configured to receive the first request to travel from the first location to the second location, at a preferred time of travel, from the user-computing device 102. In an embodiment, the first request may also comprise an information pertaining to a mode of working (e.g., a first mode or a second mode) of the transportation management server 104. In addition to the first request, the transportation management server 104 may receive the location of the user from the user-computing device 102. In an embodiment, the one or more routes may correspond to a predefined number of paths between the first location and the second location, each comprising a plurality of intermediate nodes. In an embodiment, the one or more routes may be determined using one or more state of the art algorithms, such as Dijkstra's algorithm, Bellman-Ford algorithm, and the like. In an embodiment, the transportation management server 104 may be further configured to identify at least a pooled transportation service for at least a first pair of adjacent intermediate nodes, and a public transportation service for at least a second pair of adjacent intermediate nodes. Therefore, on each route a combination of the pooled transportation service and the public transportation service is identified and accordingly recommended to the user. In an embodiment, the pooled transportation service may be a pre-initiated pooled transportation service in which the pooled transportation service has been initiated by a user other than the requesting user. In another embodiment, the transportation management server 104, in an event of unavailability of the pre-initiated pooled transportation service, may be configured to determine a likelihood to find one or more other users on the route. Based on the determined likelihood, the transportation management server 104 may recommend the user to initiate a new pooled transportation service on the route. In an embodiment, the transportation management server 104 may include hardware and/or software that may be configured to perform the one or more operations for transmitting the one or more transportation service recommendations.

In an embodiment, the transportation management server 104 may be configured to receive a selection of a transportation service recommendation from the one or more transportation service recommendations from the user-computing device 102. After receiving the selection, the transportation management server 104 is configured to book the pre-initiated pooled transportation service or the new-pooled transportation service based on the selection received from the user-computing device 102 over the network 110. In an embodiment, the transportation management server 104 may be configured to transmit a notification to the agent-computing device 108 associated with the booked pre-initiated pooled transportation service or the booked new-pooled transportation service. The notification may comprise one or more details pertaining to at least a pick up node on the route, information of the user associated with the user-computing device 102. Hereinafter, the notification comprising the one or more details pertaining to at least the pick up node of the first pair of adjacent intermediate nodes, and details pertaining to the user is referred to as a first notification.

A person having ordinary skill in the art will understand that the scope of the disclosure is not limited to the transportation management server 104 transmitting the one or more transportation service recommendations to the user based on the user request. In an embodiment, the transportation management server 104 may transmit the one or more transportation service recommendations, between the first location and the second location, to the user based on a user profile of the user.

In an embodiment, the transportation management server 104 may recommend the one or more routes for plying the pooled transportation service to one or more service providers of the pooled transportation service based at least on a demand for the pooled transportation service on the one or more routes. A method of recommending the one or more routes to the one or more service providers of the pooled transportation service has been described later in conjunction with FIG. 9.

In an embodiment, the transportation management server 104 may have communication capabilities that enable the transportation management server 104 to transmit/receive data and messages in accordance with one or more communication protocols such as, but are not limited to, FTP, WebDAV, E-Mail, SMB, NFS, and TWAIN. The transportation management server 104 may be realized through various types of application servers such as, but not limited to, a Java application server, a .NET framework application server, a Base4 application server, a PHP framework application server, or any other application server framework.

In an embodiment, the database server 106 refers to a computing device that may store at least a map data of an area, a historical data of the area, a user profile, and the first requests. The historical data may comprise a traffic information pertaining to traffic conditions on the one or more routes in the area. In an embodiment, the traffic information may correspond to a variable traffic pattern at different time buckets during a day on the one or more routes in the area. In an embodiment, the user profile associated with the user may be stored in the database server 106 during a registration of the user with the transportation management server 104. In an embodiment, the database server 106 may receive a query from the transportation management server 104 to retrieve data such as, but not limited to, the map data of an area, the historical data of the area, the user profile, and the first requests stored in the database server 106. In an embodiment the database server 106 may further be configured to store a public transportation service data and a pooled transportation service data received from a public transportation management system (not shown) and a pooled transportation management system (not shown). For querying the database server 106, one or more querying languages may be utilized such as, but not limited to, SQL, QUEL, DMX and so forth. Further, the database server 106 may be realized through various technologies such as, but not limited to, Microsoft® SQL server, Oracle, and My SQL. In an embodiment, the database server 106 may connect to the transportation management server 104, using one or more protocols such as, but not limited to, ODBC protocol and JDBC protocol.

In an embodiment, the agent-computing device 108 may refer to a computing device used by a service provider. The agent-computing device 108 may include one or more processors and one or more memories. The one or more memories may include computer readable code that may be executable by the one or more processors to perform one or more operations as specified by the service provider. In an embodiment, the agent-computing device 108 may correspond to a computing device installed in a vehicle. In an embodiment, the agent-computing device 108 may comprise one or more sensors, such as, but not limited to, a Global Positioning System (GPS) sensor, an accelerometer, a compass, and a Wi-Fi sensor. In an embodiment, the agent-computing device 108 may present a notification interface (received from the transportation management server 104) to the service provider through which the agent-computing device 108 may receive the first notification. In another embodiment, the agent-computing device 108 may receive information pertaining to the demand of the pooled transportation service on the one or more routes in the area in response to a second request. In an embodiment, the second request transmitted by the agent-computing device 108 may comprise at least the first location, and the second location between which the service provider wishes to ply the pooled transportation service. In an embodiment, the agent-computing device 108 may include hardware and software to display the visualization of the first notification, and a second notification received from the transportation management server 104. In an embodiment, the GPS sensor in the agent-computing device 108 may transmit a current location of the service provider associated with the agent-computing device 108, to the transportation management server 104. Examples of the agent-computing device 108 may include, but are not limited to, a personal computer, a laptop, a personal digital assistant, a mobile device, a tablet, or any other computing device. In an embodiment, the structure of the agent-computing device 108 has been described later in conjunction with FIG. 5.

A person having ordinary skill in the art will understand that the scope of the disclosure is not limited to the agent-computing device 108 enabled to receive the first notification, and the second notification from the transportation management server 104.

In an embodiment, the network 110 may correspond to a medium through which content and messages flow between various devices of the system environment 100 (e.g., the user-computing device 102, the transportation management server 104, the database server 106, and the agent-computing device 108). Examples of the network 110 may include, but are not limited to, a Wireless Fidelity (Wi-Fi) network, a Wide Area Network (WAN), a Local Area Network (LAN), or a Metropolitan Area Network (MAN). Various devices in the system environment 100 can connect to the network 110 in accordance with the various wired and wireless communication protocols such as Transmission Control Protocol and Internet Protocol (TCP/IP), User Datagram Protocol (UDP), and 2G, 3G, or 4G communication protocols.

Figure 2:
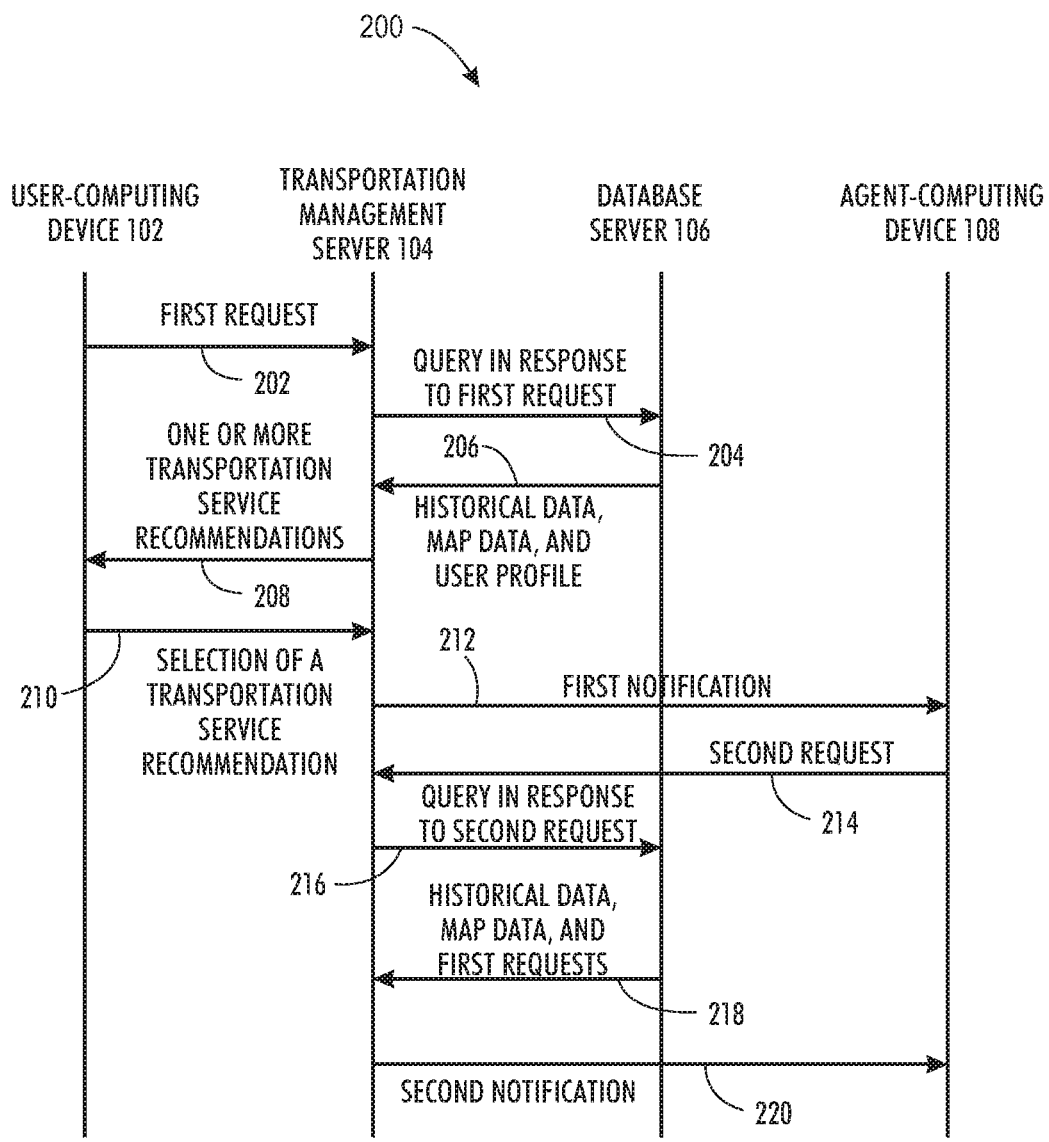
FIG. 2 is a message flow diagram illustrating an interaction between various entities of system environment.

FIG. 2 is a message flow diagram 200 illustrating an interaction between various entities of the system environment 100, in accordance with at least one embodiment. The message flow diagram 200 has been described in conjunction with FIG. 1.

In an embodiment, the user-computing device 102 may transmit the first request to travel from the first location to the second location, at a preferred time of travel, to the transportation management server 104 (depicted by 202). In an embodiment, prior to transmitting the request to the application server 104, the user has to register with the transportation management server 104. In an embodiment, during the registration, the user creates the user profile on the transportation management server 104. In an embodiment, the user-profile may comprise one or more user preferences. In an embodiment, the one or more user preferences may further comprise one or more route preferences and one or more transportation service preferences. The one or more route preferences comprise at least a preference of a route between the first location and the second location, a maximum number of intermediate hops between the first location and the second location, a maximum detour threshold, and a maximum walking threshold. The one or more transportation service preferences comprise a preference of a transportation service, a preference of make of the pooled transportation service, a maximum occupancy of the pooled transportation service, a cost constraint and a preference of co-passengers in the pooled transportation service.

In an embodiment, the transportation management server 104 may query the database server 106 (depicted by 204) to retrieve the map data of the area, the historical data, and the user profile in response to the first request. In an embodiment, the transportation management server 104 receives the map data of the area, the historical data, and the user profile (depicted by 206) from the database server. The transportation management server 104 may identify the one or more routes between the first location and the second location using one or more known algorithms. In an embodiment, the transportation management server 104 may utilize the map data of the area and the historical data to determine the one or more routes. Each of the one or more routes comprises the plurality of intermediate nodes. The transportation management server 104 may be further configured to determine the one or more transportation services between each pair of adjacent intermediate nodes of the plurality of nodes based at least on the user profile (more specifically the one or more transportation service preferences). Further, the one or more transportation services are determined in such a manner that each of the one or more routes is traversed by at least one public transportation service and at least one pooled transportation service. A person skilled in the art will appreciate that the one or more transportation services are determined such that the public transportation service and the pooled transportation service may ply between more than one pair of intermediate nodes.

The transportation management server 104 may transmit the one or more transportation service recommendations (depicted by 208), to the user-computing device 102. In an embodiment, the one or more transportation service recommendations comprise the one or more routes and the corresponding one or more transportation services. After receiving the one or more transportation service recommendations, the user-computing device 102 may display the user interface to the user. In an embodiment, the user-computing device 102 may present the one or more transportation service recommendations to the user. In an embodiment, the user may provide an input to select a transportation service recommendation from the one or more transportation service recommendations. In an embodiment, the user-computing device 102 may transmit the selection to the user (depicted by 210). The transportation management server 104 may transmit the first notification to the agent-computing device 108 (depicted by 212). As discussed, the first notification comprises the one or more details pertaining to at least the pick up location and the information of the user.

In an embodiment, the agent-computing device 108 may transmit the second request for recommendation of the one or more routes on which the service provider should ply one or more pooled transportation services (depicted by 214). In an embodiment, the transportation management server 104 may query the database server 106 to retrieve the map data of the area, the historical data, and the first requests (depicted by 216). In an embodiment, the transportation management server 104 receives the map data of the area, the historical data, and the first requests from the database server 106 (depicted by 218). In an embodiment, the transportation management server 104 may determine a demand for the pooled transportation service on the one or more routes based on a count of the first requests received from one or more users associated with one or more user-computing devices. In an embodiment, the transportation management server 104 may be further configured to transmit the second notification to the agent-computing device (depicted by 220). In an embodiment, the second notification may comprise the one or more routes recommended to the service provider based on the demand for the pooled transportation service on the one or more routes.

Figure 3:
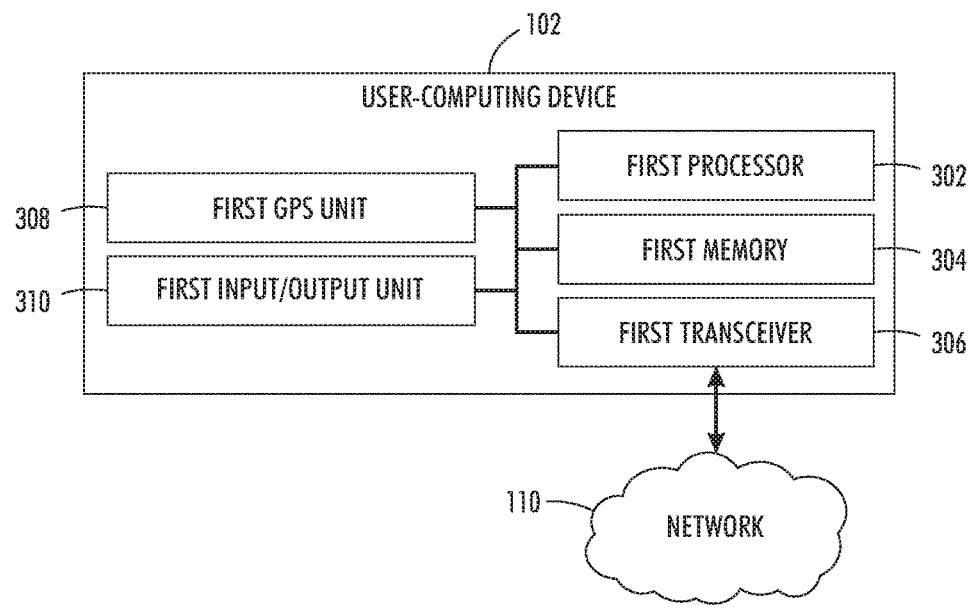
FIG. 3 is a block diagram illustrating a user-computing device, in accordance with at least one embodiment.

FIG. 3 is a block diagram illustrating the user-computing device 102, in accordance with at least one embodiment. FIG. 3 has been described in conjunction with FIG. 1 and FIG. 2. In an embodiment, the user-computing device 102 includes a first processor 302, a first memory 304, a first transceiver 306, a first GPS unit 308, and a first input/output unit 310.

The first processor 302 is coupled to the first memory 304, the first transceiver 306, the first GPS unit 308, and the first input/output unit 310. The first processor 302 includes suitable logic, circuitry, and/or interfaces that are configured to execute one or more instructions stored in the first memory 304 to perform the one or more operations as specified by the user on the user-computing device 102. The first processor 302 may be implemented using one or more processor technologies known in the art. Examples of the first processor 302 include, but are not limited to, an X86 processor, a RISC processor, an ASIC processor, a CISC processor, or any other processor.

The first memory 304 stores one or more sets of instructions, codes, programs, algorithms, data, and/or the like. Some of the commonly known memory implementations include, but are not limited to, a random access memory (RAM), a read only memory (ROM), a hard disk drive (HDD), a solid-state drive (SSD), and a secure digital (SD) card. Further, the first memory 304 includes the one or more sets of instructions that are executable by the first processor 302 to perform the one or more operations as specified by the user on the user-computing device 102. It is apparent to a person having ordinary skills in the art that the one or more sets of instructions stored in the first memory 304 enable the hardware of the user-computing device 102 to perform the one or more user specified operations.

The first transceiver 306 transmits and receives messages and data to/from various components of the system environment 100. In an embodiment, the first transceiver 306 may be communicatively coupled to the network 110. In an embodiment, the first transceiver may be configured to store the current location of the user in the database server 106. Examples of the first transceiver 306 may include, but are not limited to, an antenna, an Ethernet port, a USB port, or any other port that can be configured to receive and transmit data. The first transceiver 306 transmits and receives data/messages in accordance with various communication protocols, such as, TCP/IP, UDP, and 2G, 3G, or 4G communication protocols.

The first GPS unit 308 includes suitable logic, circuitry, and/or interfaces that are configured to execute the one or more sets of instructions stored in the first memory 304. The first GPS unit 308 may be configured to determine a geographical location pertaining to the current location of the user-computing device 102. In an embodiment, the first GPS unit 308 unit may be configured to track various locations of the user associated with the user-computing device 102 along the one or more routes. In an embodiment, the first GPS unit 308 may be configured to store the current location of the user-computing device 102 in the first memory 304.

The first input/output unit 310 may comprise suitable logic, circuitry, interfaces, and/or code that may be configured to receive an input from the user. The first input/output unit 310 may be configured to communicate with the first processor 302. In an embodiment, the user may use the first input/output unit 310 to submit an input for the first request for receiving the one or more transportation service recommendations between the first location and the second location at a preferred time of travel. In another embodiment, the first input/output unit 310 may display the results of the first request to the user. Examples of the input devices may include, but are not limited to, a keyboard, a mouse, a joystick, a touch screen, a microphone, a camera, and/or a docking station. Examples of the output devices include, but are not limited to, a display screen and/or a speaker.

Figure 4:
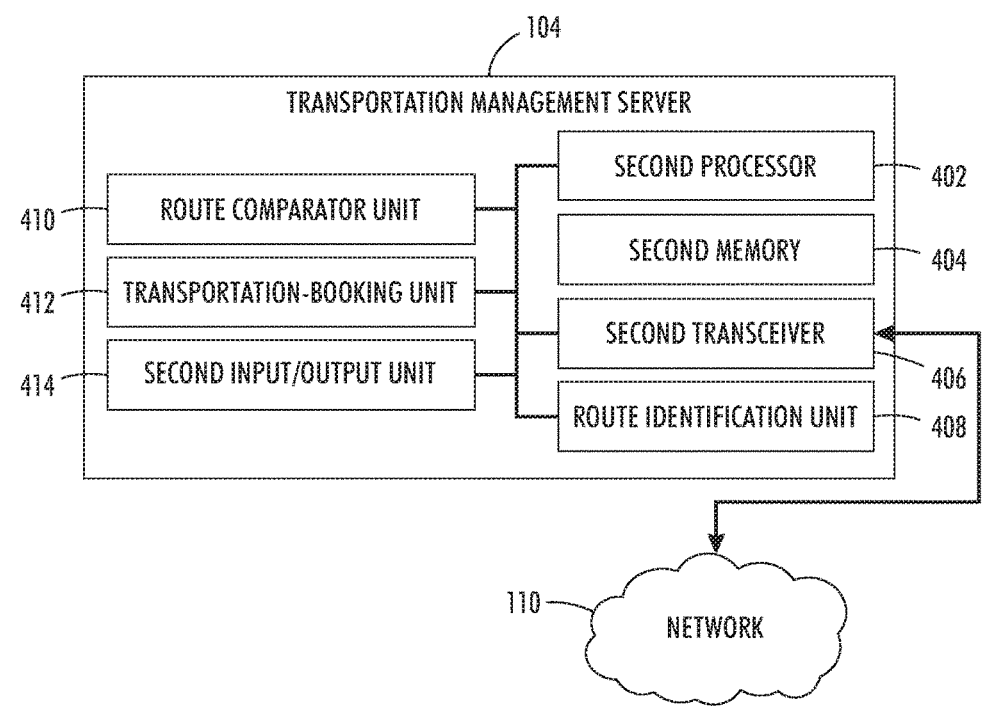
FIG. 4 is a block diagram illustrating a transportation management server, in accordance with at least one embodiment.

FIG. 4 is a block diagram illustrating the transportation management server 104, in accordance with at least one embodiment. FIG. 4 has been described in conjunction with FIG. 1, FIG. 2 and FIG. 3. In an embodiment, the transportation management server 104 includes a second processor 402, a second memory 404, a second transceiver 406, a route identification unit 408, a route comparator unit 410, a transportation-booking unit 412, and a second input/output unit 414.

The second processor 402 is coupled to the second memory 404, the second transceiver 406, the route identification unit 408, the route comparator unit 410, the transportation-booking unit 412, and the second input/output unit 414. The second processor 402 includes suitable logic, circuitry, and/or interfaces that are configured to execute one or more instructions stored in the second memory 404 to perform one or more recommendation operations. The second processor 402 may be implemented using one or more processor technologies known in the art. Examples of the second processor 402 include, but are not limited to, an X86 processor, a RISC processor, an ASIC processor, a CISC processor, or any other processor.

The second memory 404 stores one or more sets of instructions, codes, programs, algorithms, data, and/or the like. Some of the commonly known memory implementations include, but are not limited to, a random access memory (RAM), a read only memory (ROM), a hard disk drive (HDD), a solid-state drive (SSD), and a secure digital (SD) card. Further, the second memory 404 includes the one or more sets of instructions that are executable by the second processor 402, the route identification unit 408, the route comparator unit 410, and the transportation-booking unit 412. For example, the second memory 404 may be configured to store one or more route identification algorithms such as Dijkstra's algorithm, Bellman-Ford algorithm, and the like. It is apparent to a person having ordinary skills in the art that the one or more sets of instructions stored in the second memory 404 enable the hardware of the transportation management server 104 to perform the one or more recommendation operations.

The second transceiver 406 transmits and receives messages, and data to/from various components of the system environment 100. In an embodiment, the second transceiver 406 may be communicatively coupled to the network 110. Examples of the second transceiver 406 may include, but are not limited to, an antenna, an Ethernet port, an USB port, or any other port that can be configured to receive and transmit data. The second transceiver 406 transmits and receives data/messages in accordance with the various communication protocols, such as, TCP/IP, UDP, and 2G, 3G, or 4G communication protocols.

The route identification unit 408 may comprise suitable logic, circuitry, interfaces and/or code that may be configured to execute the one or more instructions stored in the second memory 404 to determine the one or more routes between the first location and the second location. In an embodiment, the route identification unit 408 may use one or more state of the art algorithms, such as Dijkstra's algorithm, Bellman-Ford algorithm, and the like to determine the one or more routes between the first location and the second location. Further, the route identification unit 408 may be configured to identify the plurality of intermediate nodes on each of the one or more routes. The route identification unit 408 may be configured to identify the one or more transportation services between each pair of the adjacent intermediate nodes of the plurality of intermediate nodes. In an embodiment, the route identification unit 408 may further be configured to recommend the one or more routes for plying the pooled transportation service to the one or more service providers of the pooled transportation service through the agent-computing device 108. The route identification unit 408 may be implemented using one or more processor technologies known in the art. Examples of the route identification unit 408 include, but are not limited to, an X86, a RISC processor, a CISC processor, or any other processor. In another embodiment, the route identification unit 408 may be implemented as an Application-Specific Integrated Circuit (ASIC) microchip designed for a special application, such as determining the one or more routes between the first location and the second location.

The route comparator unit 410 may comprise suitable logic, circuitry, interfaces and/or code that may be configured to execute the one or more instructions stored in the second memory 404 to compare one or more route parameters associated with each of the one or more routes and one or more transportation service parameters associated with the corresponding one or more transportation services, with the user profile. In another embodiment, the route comparator unit 410, may rank the one or more transportation service recommendations, based on the comparison. In an embodiment, the route comparator unit 410 may be realized through either software technologies or hardware technologies known in the art. Though, the route comparator unit 410 is depicted as independent from the second processor 402 in FIG. 4, a person skilled in the art will appreciate that the route comparator unit 410 may be implemented within the second processor 402 without departing from the scope of the disclosure.

The transportation-booking unit 412 may comprise suitable logic, circuitry, interfaces and/or code that may be configured to execute the one or more instructions stored in the second memory 404 to book the pre-initiated pooled transportation service or the new-pooled transportation service based on the received user's selection. The transportation-booking unit 412 may be implemented using one or more processor technologies known in the art. Examples of the transportation-booking unit 412 include, but are not limited to, an X86, a RISC processor, a CISC processor, or any other processor. In another embodiment, the transportation-booking unit 412 may be implemented as an Application-Specific Integrated Circuit (ASIC) microchip designed for a special application, such as booking the pooled transportation service.

The second input/output unit 414 may comprise suitable logic, circuitry, interfaces, and/or code that may be configured to receive the request or provide an output to the user. The second input/output unit 414 comprises various input and output devices that are configured to communicate with the second processor 402. Examples of the input devices include, but are not limited to, a keyboard, a mouse, a joystick, a touch screen, a microphone, a camera, and/or a docking station. Examples of the output devices include, but are not limited to, a display screen and/or a speaker.

In an embodiment, the operation of the transportation management server 104 has been described later in conjunction with FIG. 6.

Figure 5:
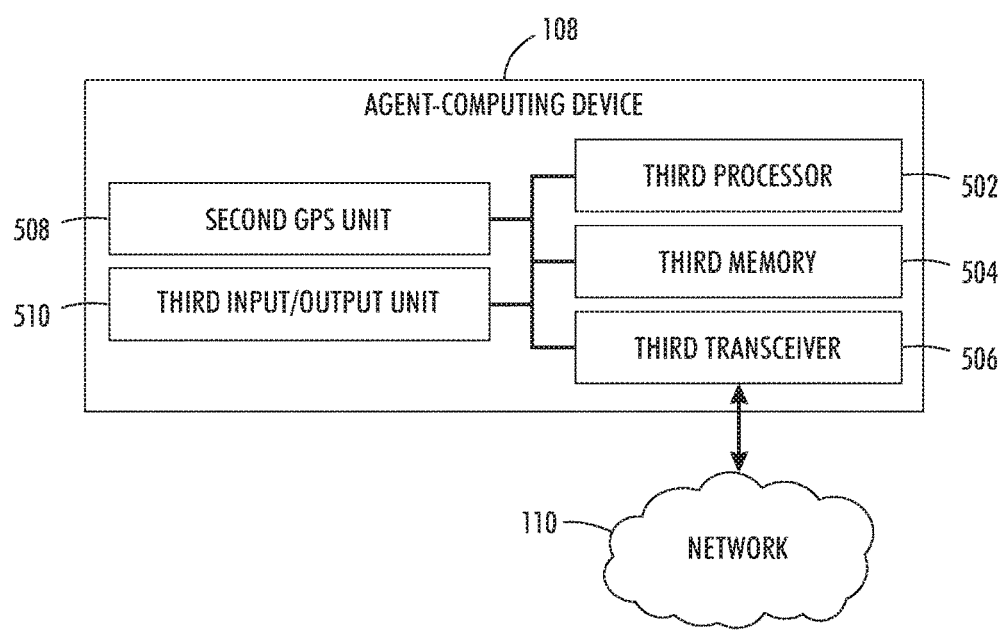
FIG. 5 is a block diagram illustrating an agent-computing device, in accordance with at least one embodiment.

FIG. 5 is a block diagram illustrating the agent-computing device 108, in accordance with at least one embodiment. FIG. 5 has been described in conjunction with FIG. 1, and FIG. 2. In an embodiment, the agent-computing device 108 includes a third processor 502, a third memory 504, a third transceiver 506, a second GPS unit 508, and a third input/output unit 510.

The third processor 502 is coupled to the third memory 504, the third transceiver 506, the second GPS unit 508, and the third input/output unit 510. The third processor 502 includes suitable logic, circuitry, and/or interfaces that are configured to execute one or more instructions stored in the third memory 504 to perform the one or more operations as specified by the user on the agent-computing device 108. The third processor 502 may be implemented using one or more processor technologies known in the art. Examples of the third processor 502 include, but are not limited to, an X86 processor, a RISC processor, an ASIC processor, a CISC processor, or any other processor.

The third memory 504 stores one or more sets of instructions, codes, programs, algorithms, data, and/or the like. Some of the commonly known memory implementations include, but are not limited to, a random access memory (RAM), a read only memory (ROM), a hard disk drive (HDD), a solid-state drive (SSD), and a secure digital (SD) card. Further, the third memory 504 includes one or more sets of instructions that are executable by the third processor 502 to perform the one or more operations as specified by the user on the agent-computing device 108. It is apparent to a person having ordinary skills in the art that the one or more sets of instructions stored in the third memory 504 enable the hardware of the agent-computing device 108 to perform the user specified operations.

The third transceiver 506 transmits and receives messages and data to/from various components of the system environment 100. In an embodiment, the third transceiver 506 may be communicatively coupled to the network 110. Examples of the third transceiver 506 may include, but are not limited to, an antenna, an Ethernet port, a USB port, or any other port that can be configured to receive and transmit data. The third transceiver 506 transmits and receives data/messages in accordance with various communication protocols, such as, TCP/IP, UDP, and 2G, 3G, or 4G communication protocols.

The second GPS unit 508 includes suitable logic, circuitry, and/or interfaces that are configured to execute the one or more sets of instructions stored in the third memory 504. The second GPS unit 508 may be configured to determine a geographical location of the agent-computing device 108. In an embodiment, the second GPS unit 508 unit may be configured to track the movement of the service provider associated with the agent-computing device 108 along the one or more routes. In an embodiment, the second GPS unit 508 may be configured to store a current location of the agent-computing device 108 in the third memory 504.

The third input/output unit 510 comprises suitable logic, circuitry, interfaces, and/or code that is configured to receive an input or transmit an output to the agent-computing device 108. The third input/output unit 510 may be configured to communicate with the third processor 502. In an embodiment, the third input/output unit 510 may display the first notification, and the second notification to the service provider associated with the agent-computing device 108. Examples of the input devices include, but are not limited to, a keyboard, a mouse, a joystick, a touch screen, a microphone, a camera, and/or a docking station. Examples of the output devices include, but are not limited to, a display screen and/or a speaker.

Figure 6:
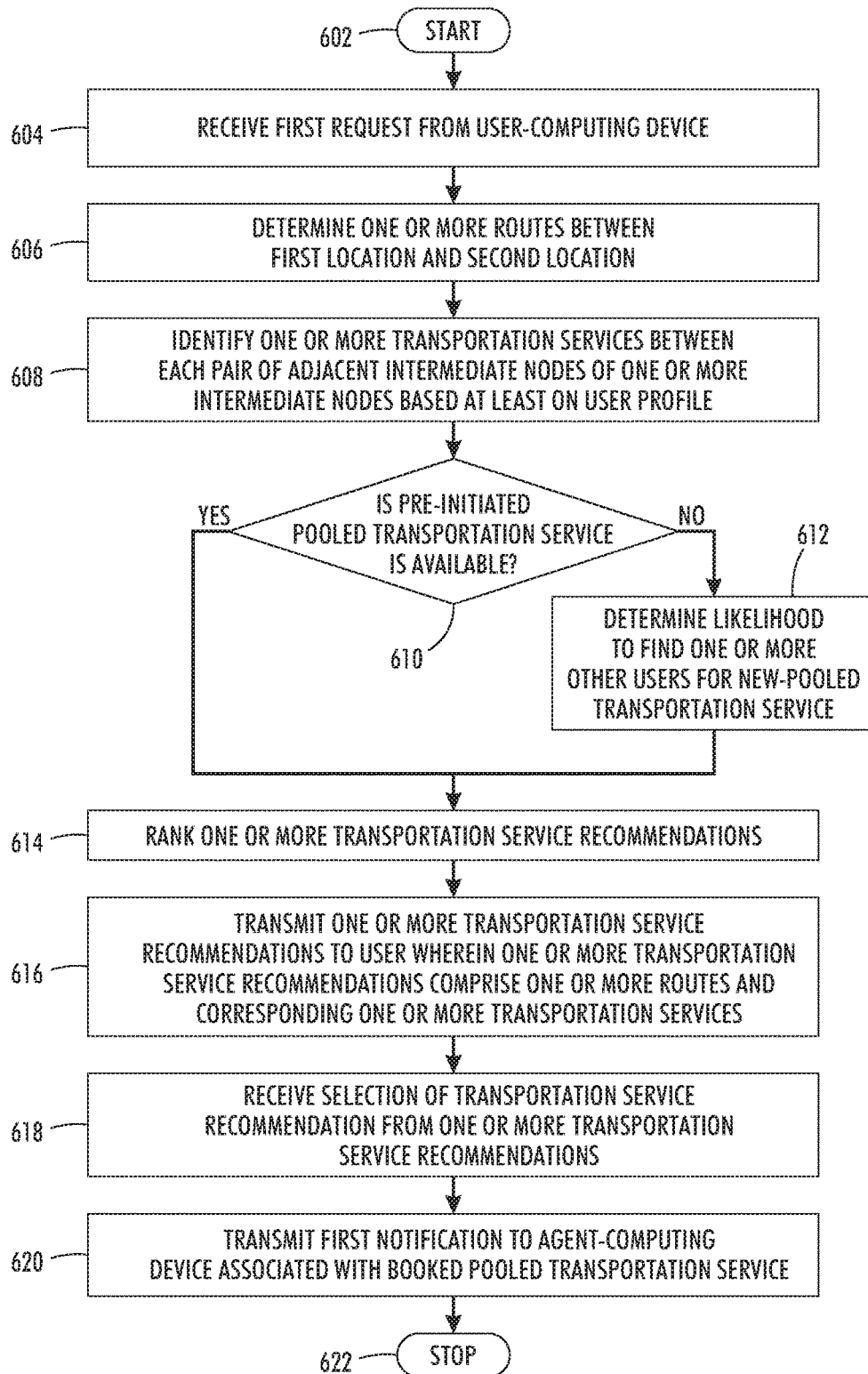
FIG. 6 is flowchart illustrating a method for transportation service recommendation, in accordance with at least one embodiment.

FIG. 6 is flowchart 600 illustrating a method for transportation service recommendation, in accordance with at least one embodiment. FIG. 6 has been described in conjunction with FIG. 1, FIG. 2, FIG. 3, FIG. 4, and FIG. 5.

The method starts at step 602. At step 604, the first request is received from the user-computing device 102. In an embodiment, the second processor 402 may receive the first request through the second transceiver 406. In an embodiment, the first request comprises information pertaining to at least the first location and the second location, and a preferred time of travel. In an embodiment, the first location may correspond to a source location from which the user of the user-computing device 102 wishes to travel. In an embodiment, the second location may correspond to the destination location of the user. In an embodiment, the time of travel may correspond to a starting time at which the user wishes to travel. On receiving the first request, the second processor 402 may retrieve the user profile of the user from the database server 106.

In an alternate embodiment, the user-computing device 102 may not transmit the first request explicitly to the user to receive the one or more transportation service recommendations. In an embodiment, the transportation management server 104 may automatically transmit the one or more transportation service recommendations between the first location and the second location based at least on the user profile stored in the database server 106. In an embodiment, the first location and the second location may correspond to the frequently visited location of the user. For example, the first location may correspond to the home location of the user and the second location may correspond to the office location of the user. For example, a user associated with the user-computing device 102 travels between a location "A" and a location "B" from Monday to Friday at 6:45 AM. The first GPS unit 308 may track locations of the user. The first transceiver 306 may transmit the tracked locations of the user to the database server 106 over the network 110. In this scenario, the route identification unit 408 may consider the location "A" as the first location and the location 'B" as the second location.

In an embodiment, the user may provide an input to modify the user profile. For example, the user may provide input to change the one or more user preferences such as the one or more route preferences, and the one or more transportation service preferences.

At step 606, the one or more routes between the first location and the second location is determined. In an embodiment, the route identification unit 408 in conjunction with the second processor 402 may be configured to determine the one or more routes between the first location and the second location. To identify the one or more routes between the first location and the second location, the route identification unit 408 may extract the one or more route preferences from the one or more user preferences in the user profile of the user. The one or more route preferences may comprise the preference of route between the first location and the second location, the maximum number of intermediate hops between the first location and the second location, the maximum detour threshold ($d_{max}$), and the maximum walking threshold ($w_{max}$). In addition to the one or more route preferences, the route identification unit 408 may retrieve map data, the historical data from the database server 106 and real time data of traffic conditions from the one or more sensors. In an embodiment, the route identification unit 408 may identify the one or more routes based on the one or more route preferences, the map data and the real time data.

In an exemplary implementation, the route identification unit 408 may overlay a grid on the map data, based on the maximum detour threshold ($d_{max}$), and the maximum walking radius ($w_{max}$), such that the length of a square in the grid may correspond to a minima of ($d_{max}$, $w_{max}$). Hereinafter, a plurality of squares in the grid has been referred to as a plurality of nodes. Further, the route identification unit 408 may generate a weighted graph G based on the plurality of nodes and a set of edges wherein an edge (e) in the set of edges may represent a geographical distance between a pair of nodes in the plurality of nodes. In an embodiment, the weighted graph G may be represented by G=($\mathbb{Z}$, ε), where $\mathbb{Z}$ represents the plurality of nodes and ε represents the set of edges.

In an embodiment, the route identification unit 408 may divide the duration of the day (i.e., 24 hours) in a set of time buckets (T) based on the variable traffic pattern retrieved from the database server 106. For example, during a time duration between 8:00 AM and 9:00 AM, the traffic on the routes is at peak. Therefore, the route identification unit 408 may consider the time duration between 8 AM and 9 AM as a time bucket. The route identification unit 408 may associate a vector of weights ($\hat{w}_e$) with each edge in the set of edges, wherein the length of the vector of weights is represented by $|\hat{w}_e|=|T|+1$. In an embodiment, $w_{e,1}$ may represent the geographical distance between the pair of nodes in the plurality of nodes and $w_{e,t}$ may represent an average time required to travel between a pair of nodes in the plurality of nodes in time bucket i. In an embodiment, the weight of each edge in the set of edges may be determined by using equation 1 as shown below:

$$\hat{w}_e = \alpha w_{e,1} + \beta w_{e,t} \quad (1)$$

where,

α, and β are any real numbers used for optimizing the length of the one or more routes, or the average time to travel on the one or more routes.

Let R=$\mathbb{Z} \times \mathbb{Z} \times$T denote a set of first requests specified by (s, d, t) where s∈$\mathbb{Z}$, d∈$\mathbb{Z}$, and t∈T. Let P={$P_r$=∀$_r$∈R}, where $P_r$ denotes a set of k shortest paths for a demand r. In an embodiment, $P_r$ may correspond to the one or more routes. Each path p∈$P_r$ for the demand r∈R is specified by a sequence of nodes, starting with a source node (s) in r and ending with a destination node (d) in r. In an embodiment, the source node may correspond to the first location and the destination node may correspond to the second location. The route identification unit 408 may determine 'k' shortest paths between the source node and the destination node, wherein the shortest path may be determined based on the length of the path, the average time to travel, or a combination of both. Hereinafter, the k shortest paths between the source node and the destination node has been referred to as a plurality of routes between the first location and the second location.

A person having ordinary skill in the art will understand that a path from the source node to the destination node will comprise one or more nodes from the plurality of nodes. In an embodiment, length of a path in the 'k' shortest path may correspond to sum of lengths of edges between one or more pair of nodes comprised by the path. The one or more nodes may correspond to the one or more intermediate nodes.

A person skilled in the art will understand that the abovementioned exemplary implementation for the determination of k shortest paths has been provided for illustrative purposes and should not be construed to limit the scope of the disclosure.

In an embodiment, the route identification unit 408 may identify the one or more routes between the first location and the second location from the plurality of routes between the first location and the second location based on the one or more route preferences specified by the user in the user profile. The plurality of routes corresponds to all possible routes available between the first location and the second location irrespective of the one or more route preferences specified by the user in the user profile. The one or more route preferences may include the preference of route between the first location and the second location, a maximum number of intermediate hops between the first location and the second location, the maximum detour threshold ($d_{max}$), or the maximum walking threshold ($w_{max}$). For example, if the shortest distance between the first location and the second location is 10 km and the maximum detour threshold is 1 km, the route identification unit 408 may identify only those routes from the plurality of routes with a distance less than or equal to 11 km. In an embodiment, the user may specify to include or exclude a specific intermediate node, and then the route identification unit 408 may identify only the routes complying with the user specification of inclusion or exclusion of the specific intermediate node from the plurality of routes.

At step 608, the one or more transportation services between each pair of the adjacent intermediate nodes of the plurality of intermediate nodes are identified. The route identification unit 408 may be configured to identify the one or more transportation services between each pair of the adjacent intermediate nodes of the plurality of intermediate nodes. In an embodiment, the route identification unit 408 may identify the one or more transportation services in such a way that the one or more transportation services comply with the preferred time of travel specified by the user in the first request. For example, if a user has specified a preferred time of travel to be 4 PM then the transportation services having a start time prior to 4 PM may not be identified. To identify the one or more transportation services between each pair of the adjacent intermediate nodes of the plurality of intermediate nodes, the route identification unit 408 may extract the one or more transportation service preferences from the user profile of the user. The one or more transportation service preferences may comprise the preference of the transportation service, the preference of make of the pooled transportation service, the maximum occupancy of the pooled transportation service, the cost constraint and the preference of co-passengers in the pooled transportation service.

In an embodiment, the route identification unit 408 may retrieve the public transportation service data and the pooled transportation service data from the database server 106. The public transportation service data may comprise a schedule of public transportation service plying between a pair of the adjacent intermediate nodes of the plurality of intermediate nodes in the one or more routes and a vehicle ID of the public transportation service. For example, a bus "B1" with vehicle id "XXXX" plies on a route between "A" and "B" passing through an intermediate node "a". The Bus "B1" leaves "A" at 7 AM and reaches "a" at 7:45 AM. After waiting for five minutes, B1 leaves "a" at 7:50 AM and reaches "B" at 8:30 AM. Then B1 waits for 30 minutes and departs for "A" following the similar pattern. In this scenario, the schedule of the bus 'B1' corresponds to the public transportation service data. A person having ordinary skills in the art will appreciate that it may not be necessary that that public transportation service ply between each pair of intermediate adjacent nodes on a route. In an embodiment, there may exist a pair of intermediate nodes for which the public transportation service is not available.

The pooled transportation service data may comprise information pertaining to an availability, an occupancy, make of the vehicle, ID of the service provider, and the current location of the pooled transportation service on the one or more routes. For example, a pre-initiated pooled transportation service "P1" with vehicle ID "YYYY" currently plying on a route "B" to "C" has two passengers. "P1" is a "sedan". The route identification unit 408 has identified the arrival time of "P1" at "C" based on the current location of 'P1" and the speed of "P1". In this scenario, the schedule of the pre-initiated pooled transportation service "P1" corresponds the pooled transportation service data. In an embodiment, the route identification unit 408 may determine an arrival time of the pooled transportation service based on the current location of the pooled transportation service and a speed of the pooled transportation service.

In an embodiment, the route identification unit 408 may identify the pre-initiated pooled transportation service for at least the first pair of adjacent intermediate nodes, and the public transportation service for at least the second pair of adjacent intermediate nodes based on the one or more transportation service preferences, the public transportation service data and the pooled transportation service data. For example the route identification unit 408 has to identify the one or more transportation services plying between a first location "A" and a second location "B" having "a", "b", and "c" as intermediate nodes. Table 1 illustrates the one or more transportation service preferences of the user:

TABLE 1

Illustration of the one or more transportation service parameters

| One or more transportation service preferences | Preference value |
| --- | --- |
| Transportation service | Pre-initiated pooled transportation |
| Make of the pooled transportation service | Sedan |
| Maximum occupancy of the pooled transportation service | Three |
| Preference of co-passengers in the pooled transportation service | Females working in the same organization of the user |

Table 2 illustrates one or more transportation services available between a first location "A" and a second location "B:

TABLE 2

Illustration of the one or more transportation services available between the first location and the second location

| Route information | Transportation service | Transportation service parameters |
| --- | --- | --- |
| From "A" to "a" | Bus "B1" Metro "M1" | |
| From "a" to "b" | Metro "M1" | |
| | Pre-initiated pooled transportation service "P1" | Make - Hatchback Current Occupancy- 3 Co-passengers - 2 males and 1 female working in different organizations |
| From "b" to "c" | Pre-initiated pooled | Make - Hatchback Current Occupancy- 2 |

TABLE 2-continued

Illustration of the one or more transportation services available between the first location and the second location

| Route information | Transportation service | Transportation service parameters |
|---|---|---|
| | transportation service "P1" | Co-passengers - 2 males and 1 female working in different organizations |
| | Pre-initiated Pooled transportation service "P2" | Make - Sedan Current Occupancy- 2 Co-passengers - 2 females working in the same organization as of the user |
| From "c" to "B" | Pre-initiated pooled transportation service "P2" Bus "B2" | Make - Sedan Current Occupancy- 2 Co-passengers - 2 females from same organization |

Table 3 illustrates the one or more transportation services identified by the route identification unit 408 between a first location "A" and a second location "B based on the one or more transportation service preferences of the user:

TABLE 3

Illustration of the one or more transportation services identified by the route identification unit 408 between a first location "A" and a second location "B

| Route information | Identified Transportation service |
|---|---|
| From "A" to "a" | Bus "B1" Metro "M1" |
| From "a" to "b" | Metro "M1" |
| From "b" to "c" | Pre-initiated pooled transportation service "P2" |
| From "c" to "B" | Pre-initiated pooled transportation service "P2" |

In this scenario, the route identification unit 408 identifies "B1" and "M1" for travelling from "A" to "a", 'M1" for travelling from "a" to "b", "P2" for travelling from "b" to "c" and "P2" for travelling from "c" to "B" based on the one or more transportation preferences specified by the user as illustrated in Table 1. Further, the route identification unit 408 has not identified the pre-initiated pooled transportation service P1 (as illustrated in Table 2) for travelling from "a" to "b" as it does not comply with the one or more transportation preferences specified by the user. As illustrated in Table 2, the pre-initiated pooled transportation service P1 is of make "hatchback" with current occupancy as 3, i.e., 2 males and 1 female working in different organizations. Thus, P1 does not comply with the make "sedan", the maximum occupancy "3" of the pooled transportation service and the preference of co-passengers in the pooled transportation service "2 females working in same organization as of user". As illustrated in Table 3, the route identification unit 408 has identified a combination of public transportation service and the pooled transportation service between "A" and "B" in compliance with the one or more transportation service preferences of the user.

In an embodiment, the route identification unit 408 may determine a price charged by the one or more transportation services. In an embodiment, route identification unit 408 may utilize the cost constraint specified by the user in the user profile for further filtering of the one or more transportation services. The route identification unit 408 may compare the cost constraint specified by the user with the price charged by the one or more transportation services for determining the one or more transportation services. For example, if a user has specified the cost constraint of $2, a first transportation service has the price of $1 and a second transportation service has the price of $3. In this scenario, the second transportation service is not identified as $3 exceeds $2.

A person skilled in the art will understand that the abovementioned example, filtering of the one or more transportation services based on the cost constraint specified by the user, has been provided for illustrative purposes and should not be construed to limit the scope of the disclosure.

At step 610, a check is performed to determine if the pre-initiated pooled transportation service is available on each of the one or more routes between the first location and the second location. In an embodiment, the route identification unit 408 may perform a check to determine if the pre-initiated pooled transportation service is available. For example, the route identification unit 408 may identify that the pre-initiated pooled transportation service "P2" is available on a route from the one or more routes (refer Table 3). In certain scenarios, the route identification unit 408 may identify that no pre-initiated pooled transportation service is available on the route. If at step 610, it is determined that the pre-initiated pooled transportation service is available, step 614 is performed. If at step 610, it is determined that the pre-initiated pooled transportation service is unavailable, step 612 is performed. In an embodiment, if the route identification unit 408 determines no pre-initiated pooled transportation service, complying with the one or more transportation service preferences as specified by the user, step 612 is performed.

At step 612, the likelihood to find one or more other users, for the new-pooled transportation service, on the route is determined. In an embodiment, the route identification unit 408 may determine the likelihood to find the one or more other users, for the new-pooled transportation service on the route. In an embodiment, the route identification unit 408 may utilize the count of the first requests received from the one or more other users, for the one or more routes. The route identification unit 408 may use the one or more state of the art algorithms such as algorithmic probability and/or the like to analyze the count of the first requests for determining the likelihood to find the one or more other users for the new-pooled transportation service.

For example, the route identification unit 408 has identified a route between A and B that has x, y, z as intermediate nodes. The route is represented by A→x→y→z→B. Further, the route identification unit 408 determines that the pre-initiated pooled transportation service is not available between z and B. in such a scenario, the route identification unit 408 may determine the count of the first request received from other user. Table 4 illustrates the first requests received from the other users:

TABLE 4

The first request received from the other users

| Users | Routes |
|---|---|
| User-1 | C->k->l->z->B |
| User-2 | D->l->k->n->A |
| User-3 | E->m->n->z->B |

The route identification unit 408 may determine that "user-1" and "user-3" have a common path "z→B" with the user who has requested for the route between A and B.

Therefore, the route identification unit 408 may determine a likelihood of the user-1 and user-3 opting for the pooled transportation service between "z→B".

A person having ordinary skills in the art will understand that the scope of the disclosure is not limited to determining the likelihood based on the one or more first requests received from the one or more other users. In an embodiment, various other constrains such as cost and time of travel associated with the one or more first request received from the one or more other users may be taken into account for determining the likelihood.

In addition to the likelihood, in an embodiment, the route identification unit 408 may determine a price information pertaining to the new-pooled transportation service. The price information comprises a projected price of the new-pooled transportation service in an event if no other users are found, a shared price in an event if required number of other users are found.

In an exemplary implementation, the route identification unit 408 may compute the projected price $c_p$ for entire journey along the one or more routes. The projected price $c_p$ may be proportional to the length (l) and the time of travel of the one or more routes. The route identification unit 408 may determine a projected price per unit distance ($\hat{c}_p$) and an occupancy (o) for the pooled transportation service. In an embodiment, the route identification unit 408 may determine a shared price per unit distance ($c_u$) paid by every user travelling in the pooled transportation service for a segment ($l_b$) of the length l of the one or more routes using equation 2.

$$c_u = \frac{l_b}{o_b}\hat{c}_p \quad (2)$$

In an embodiment, the route identification unit 408 may use the shared price per unit distance $c_u$ for identifying the shared price by every user in the pooled transportation service for the entire length of the one or more routes.

A person skilled in the art will understand that the abovementioned exemplary implementation, for determining the total price paid by every user in the pooled transportation service, has been provided for illustrative purposes and should not be construed to limit the scope of the disclosure.

At step 614, the one or more transportation service recommendations, as discussed supra, are ranked. In an embodiment, the route comparator unit 410 may rank the one or more transportation service recommendations. In an embodiment, the one or more transportation service recommendations may correspond to the one or more routes and the corresponding one or more transportation services identified by the route identification unit 408. In an embodiment, the route identification unit 408 may determine the one or more route parameters and the one or more transportation service parameters associated with the identified one or more routes and the identified transportation service on the one or more routes, respectively. In an embodiment, the one or more route parameters may comprise at least a number of intermediate hops in the one or more routes, a distance of walking leg in the one or more routes, and a detour distance from the shortest path between the first location and the second location in the one or more routes. The one or more transportation service parameters may comprise a travel time information, and the price charged by the corresponding one or more transportation services. In an embodiment, the route comparator unit 410 may rank the one or more transportation service recommendations based on a comparison of the one or more route parameters associated with each of the one or more routes and the one or more transportation service parameters associated with the corresponding one or more transportation services, with the user profile. In an embodiment, the route identification unit 408 may assign weights "w" to the one or more route parameters and the one or more transportation service parameters. In an embodiment, the weights "w" are predefined by the user. In another embodiment, the weights "w" may be determined automatically based on the user profile. In yet another embodiment, the weights "w" may be determined based on the selection of a route or transportation service previously made by the user. For example, the user selected a route with a pooled transportation service having a maximum detour of 1 KM. Then a higher weightage is assigned to the pooled transportation service and the detour parameter.

In an embodiment, the route comparator unit 410 may utilize the weights "w" assigned to the one or more route parameters and the one or more transportation service parameters to generate a score N for the one or more transportation service recommendations. The score N may be generated by using equation 3 as shown below:

$$N_i = \Sigma_j w_j p_j \quad (3)$$

where, $N_i$ represents the score generated for $i^{th}$ transportation service recommendation in the one or more transportation service recommendations, $w_j$ represents the weight assigned to a $j^{th}$ parameter in the one or more route parameters and the one or more transportation service parameters, and $p_j$ represents a $j^{th}$ parameter in the one or more route parameters and the one or more transportation service parameters.

In an embodiment, the route comparator unit 410 may be configured to rank the one or more transportation service recommendations based on the score N.

A person having ordinary skill in the art will understand that the abovementioned exemplary implementation, for ranking the one or more transportation service recommendations, has been provided for illustrative purposes and should not be construed to limit the scope of the disclosure.

Before ranking, in an embodiment, the route identification unit 408 may filter out the one or more transportation service recommendations based on the cost constraint and the maximum walking threshold as specified by the user in the user profile. For example, if a user has specified a cost constraint of $7 and a maximum walking threshold of 1 km, the transportation service recommendation, in the one or more transportation service recommendations, with more than $7 of cost or more than a 1 km of walking leg may be filtered out.

At step 616, the one or more transportation service recommendations are transmitted to the user-computing device 102. In an embodiment, the second transceiver 406 may be configured to transmit the one or more transportation service recommendations, wherein the one or more transportation service recommendations comprise one or more routes and the corresponding one or more transportation services, to the user-computing device 102. In an embodiment, the first transceiver 306 may be configured to receive the one or more transportation service recommendations. In an embodiment, the first input/output unit 310 may be configured to display the one or more transportation service recommendations to the user. In an embodiment, a user input may be required to select a transportation service recommendation from the one or more transportation service recommendations. In an embodiment, the first transceiver 306 may be configured to store the user selection and a current location of the user in the database server 106.

At step 618, a selection of the transportation service recommendation from the one or more transportation service recommendations is received. In an embodiment, the second transceiver 406 may be configured to receive the selection of the transportation service recommendation from the one or more transportation service recommendations from the user-computing device 102. In another embodiment, the second transceiver 406 may be configured to query the database server 106 to retrieve the selection of the user and the current location of the user associated with the user-computing device 102. In an embodiment, the transportation-booking unit 412 may be configured to book the pre-initiated pooled transportation service based on the received selection of the user. In another embodiment, the transportation-booking unit 412 may be configured to book the new-pooled transportation service in the event of unavailability of the pre-initiated pooled transportation service based on the received selection.

At step 620, the first notification to the agent-computing device 108 associated with the booked pooled transportation service is transmitted. In an embodiment, the second transceiver 406 may be configured to transmit the first notification to the agent-computing device 108 associated with the booked pooled transportation service. In an embodiment, the agent-computing device 108 may be associated with a service provider of the pooled transportation service. In another embodiment, the agent-computing device 108 may be associated with a private transportation service owner, wherein the private transportation service owner has requested the transportation management server 104 to find one or more users for pooling the private transportation service. The first notification may comprise the one or more of details pertaining to the pick up node of the first pair of adjacent intermediate nodes, and information of the user. In an embodiment, the pick up node may correspond to the current location of the user. The second transceiver 406 may receive location details of the agent-computing device 108 associated with the booked pooled transportation service.

In an embodiment, simultaneously to the first notification, the second transceiver 406 may transmit the details pertaining to the service provider of the booked pooled transportation service to the user-computing device 102. The details pertaining to the service provider may comprise at least the vehicle ID of the booked pooled transportation service, the arrival time of the booked pooled transportation service, and a current location of the booked pooled transportation service. The method stops at step 622.

Figure 7A:
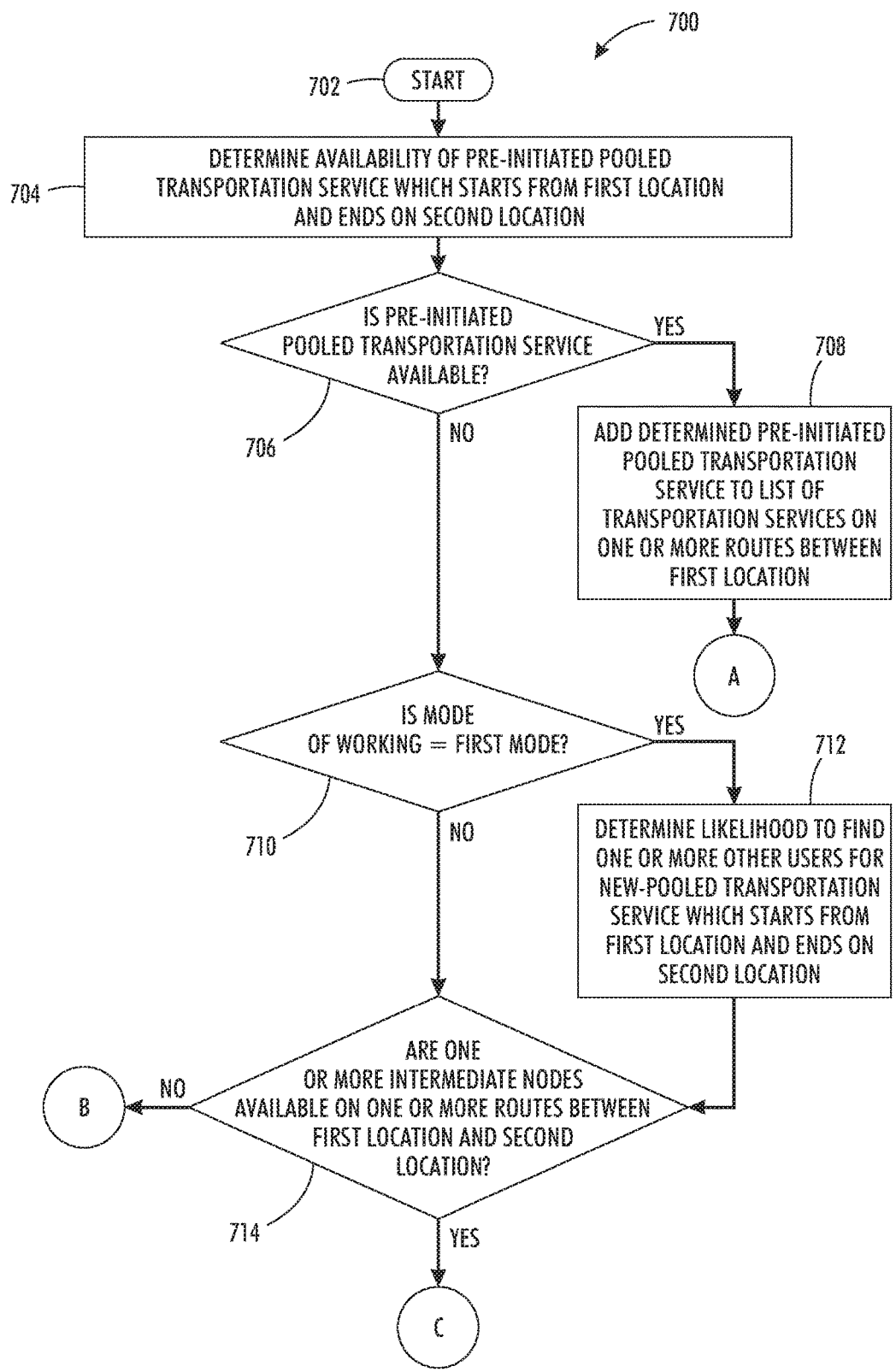
FIGS. 7A and 7B are flowcharts illustrating a method for identification of pooled transportation service by transportation management server, in accordance with at least one embodiment.
Figure 7B:
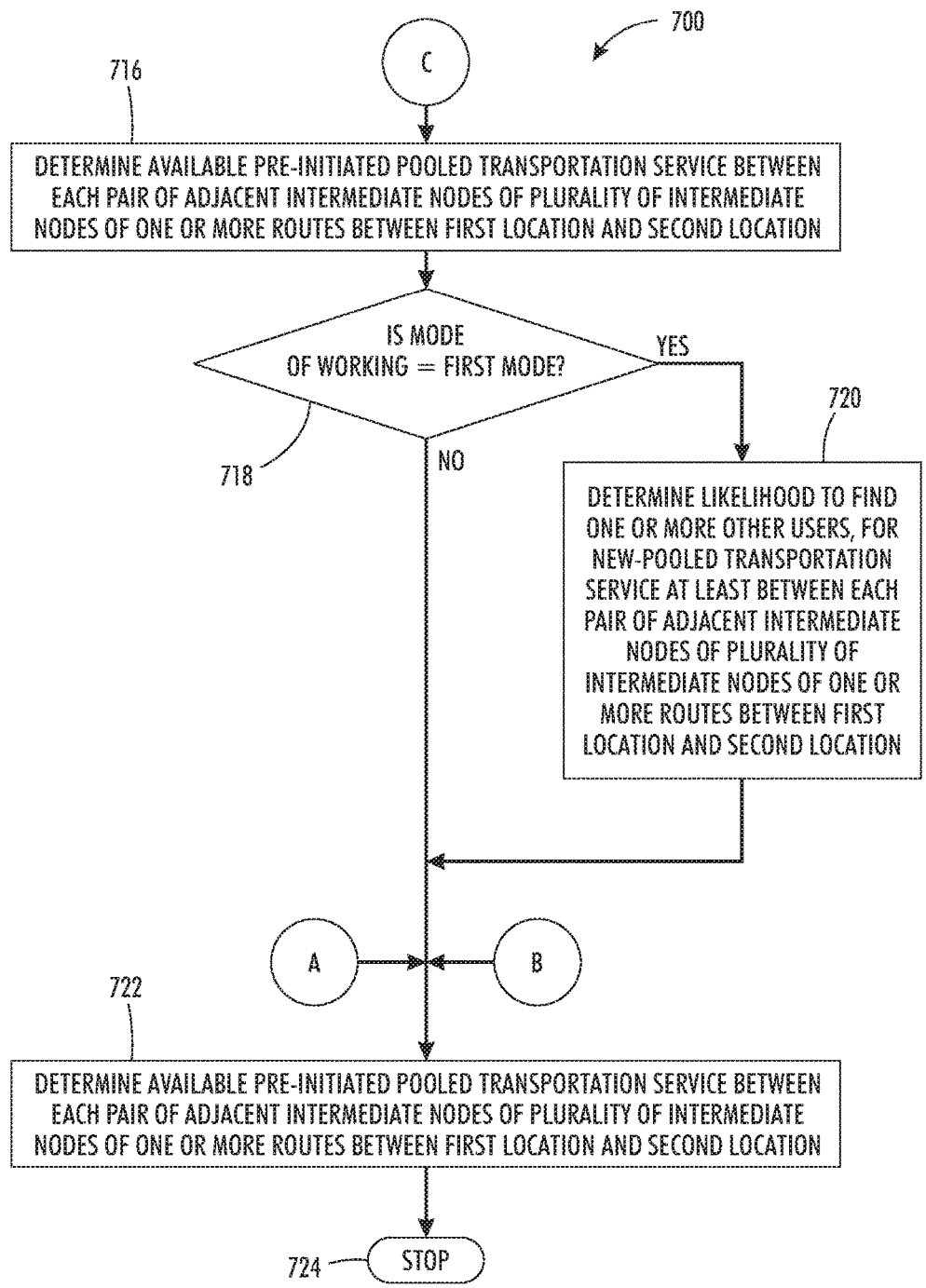

FIG. 7A and FIG. 7B are flowcharts illustrating a method for the identification of the pooled transportation service by the transportation management server 104, in accordance with at least one embodiment; FIG. 7A and FIG. 7B have been described in conjunction with FIG. 1, FIG. 2, FIG. 3, FIG. 4, FIG. 5 and FIG. 6.

The method starts at step 702. At step 704, availability of the pre-initiated pooled transportation service, which starts from the first location and ends on the second location is determined. In an embodiment, the route identification unit 408 may be configured to determine the availability of the pre-initiated pooled transportation service, which starts from the first location and ends on the second location (as determined in step 608).

At step 706, a check is performed to determine the availability of any pre-initiated pooled transportation service, which starts from the first location and ends on the second location. In an embodiment, the route identification unit 408 may be configured to perform the check to determine if there is any pre-initiated pooled transportation service available, which starts from the first location and ends on the second location. If at step 706, it is determined that the pre-initiated pooled transportation service is available, step 708 is performed. If at step 706, it is determined that the pre-initiated pooled transportation service is unavailable, step 710 is performed.

At step 708, the determined pre-initiated pooled transportation service is added to a list of transportation services on the one or more routes between the first location and the second location. In an embodiment, prior to the determination of the pre-initiated pooled transportation service the list of transportation services may comprise one or more public transportation services plying on the one or more routes between the first location and the second location. In an embodiment, the route identification unit 408 may be configured to add the determined pre-initiated pooled transportation service to the list of transportation services between the first location and the second location.

At step 710, a check is performed to determine if the mode of working of the route identification unit 408 is the first mode. In an embodiment, the second processor 402 may be configured to perform the check to determine if the mode of working of the route identification unit 408 is the first mode. If at step 706, it is determined that the mode of working of the route identification unit 408 is the first mode, then step 712 is performed. If at step 710, it is determined that mode of working of the route identification unit 408 is the second mode, then step 714 is performed.

At step 712, the likelihood to find the one or more other users, for the new-pooled transportation service, which starts from the first location and ends on the second location is determined. In an embodiment, the route identification unit 408 may be configured to determine the likelihood, to find the one or more other users, for the new-pooled transportation service which starts from the first location and ends on the second location (as determined in step 612). In an embodiment, the route identification unit 408 may add the new-pooled transportation service to the list of transportation services.

At step 714, a check is performed to determine if the one or more intermediate nodes are available on the one or more routes between the first location and the second location. In an embodiment, the route identification unit 408 may be configured to perform the check. The route identification unit 408 may query the database server 106 to retrieve the information corresponding to the one or more intermediate nodes on the one or more routes. The database server 106 may return the information pertaining to the one or more intermediate nodes, in response to the query. If at step 714, it is determined that the information pertaining to the one or more intermediate nodes is available, step 716 is performed. If at step 714, it is determined that the information pertaining to the one or more intermediate nodes is unavailable, step 722 is performed.

At step 716, availability of the pre-initiated pooled transportation service between each pair of the adjacent intermediate nodes of the plurality of intermediate nodes of the one or more routes, between the first location and the second location, is determined. In an embodiment, the route identification unit 408 may further be configured to determine the available pre-initiated pooled transportation service between each pair of the adjacent intermediate nodes of the plurality of intermediate nodes of the one or more routes between the first location and the second location. In an embodiment, the route identification unit 408 may add the available pre-initiated pooled transportation service between each pair of the adjacent intermediate nodes of the plurality of intermediate nodes of the one or more routes, between the first location and the second location to the list of transportation services.

At step 718, a check is performed to determine if the mode of working of the route identification unit 408 is the first mode. In an embodiment, the second processor 402 may be configured to perform the check to determine if the mode of working of the route identification unit 408 is the first mode. If at step 718, it is determined that mode of working of the route identification unit 408 is the first mode, step 720 is performed. If at step 718, it is determined that mode of working of the route identification unit 408 is the second mode, step 722 is performed.

At step 720, the likelihood is determined to find the one or more other users, for the new-pooled transportation service, at least between the first pair of the adjacent intermediate nodes of the plurality of intermediate nodes of the one or more routes between the first location and the second location. In an embodiment, the route identification unit 408 may be configured to determine the likelihood, to find the one or more other users, for the new-pooled transportation service, at least between the first pair of the adjacent intermediate nodes of the plurality of intermediate nodes of the one or more routes between the first location and the second location. The route identification unit 408 may further be configured to add the new-pooled transportation service to the list of transportation services to determine a final list of transportation services.

At step 722, the final list of transportation services is stored in the database server 106. In an embodiment, the route identification unit 408 may store the list of transportation services in the database server. In an embodiment, the final list of transportation services may correspond to the one or more transportation services on each of the one or more routes between the first location and the second location. The method stops at step 724.

Figure 8A:
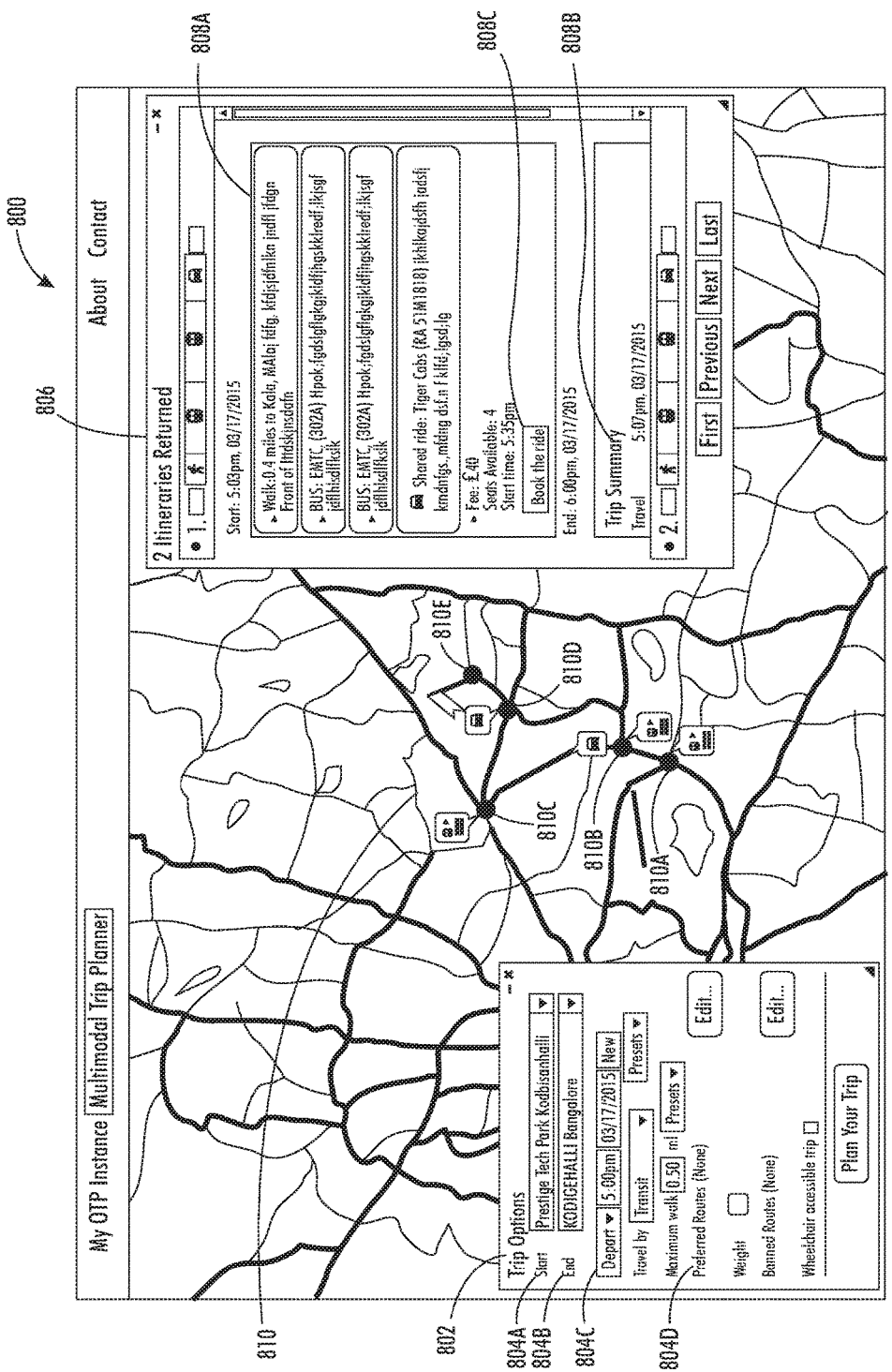
FIGS. 8A and 8B illustrate an exemplary Graphical User Interface (GUI) presented on the user-computing device in an event of availability of pre-initiated pooled transportation service, in accordance with at least one embodiment.

FIG. 8A illustrates an exemplary Graphical User Interface 800 presented on the user-computing device 102 in an event of availability of the pre-initiated pooled transportation service. FIG. 8A has been described in conjunction with FIG. 1, FIG. 2, FIG. 3, FIG. 4, FIG. 5, and FIG. 6.

Referring to FIG. 8A, the Graphical User Interface (GUI) comprises a trip options section 802, an itinerary section 806, and a route display section 810. In an embodiment, the itinerary section 806, and the route display section 810 may only be displayed in the GUI when the user has filled one or more fields present in the trip options section 802. In an embodiment, the GUI with only the trip section corresponds to the request interface presented to the user by the transportation management server 104.

The one or more fields in the trip options section 802 comprises a start field 804*a*, an end field 804*b*, a time of travel field 804*c*, and a user preference field 804*d*. In the start field 804*a*, the user may input a source location of a trip. In the end field 804*b*, the user may input a destination location of the trip. In the time of travel field 804*c*, the user may input a time and a date of the trip. The user preference field 804*d* may comprise various options for customizing the trip for the user based on the user preferences. For instance, the user preference field 804*d* may comprise a maximum walk distance preference, a route preference, a maximum detour threshold preference and/or the like. In an embodiment, the user preference filled 804*d* may customize the trip for the user based on the one or more route preferences and the one or more transportation service preferences in the user profile stored in the database 106.

The itinerary section 806 displays an itinerary returned summary 808*a*, and a trip summary 808*b* to the user. The itinerary returned summary 808*a* comprises the one or more transportation service recommendations which further comprises the recommended one or more routes and the corresponding one or more transportation services. Further, the itinerary returned summary 808*a* comprises a complete detail corresponding to the one or more transportation services available on the recommended one or more routes. For instance, the complete detail may comprise a start time and an end time information of the trip, a starting and an ending of the corresponding one or more transportation services, and a distance travelled on the corresponding one or more transportation services. In an embodiment, the displayed one or more routes and the corresponding one or more transportation services may be ranked based on the score N, as discussed supra. In an embodiment, the itinerary returned summary 808*a* may comprise at least an option to book the pre-initiated pooled transportation service for at least the first pair of adjacent intermediate nodes, in the event of availability of the pre-initiated pooled transportation service, using a book the ride button 808*c*. The trip summary 808*b* comprises a complete summary of the trip, wherein the summary comprises a time stamp associated with start time of the trip, a total time duration of the trip, a walking distance during the trip, a count of intermediate hops during the trip, and a price of the trip.

The route display section 810 on the GUI 800 displays, the recommended one or more routes, wherein the recommended one or more routes comprises a plurality of nodes (depicted by 810*a*, 810*b*, 810*c*, 810*d*, and 810*e*) in a map format, to the user through the first input/output unit 310. The nodes 810*a* and 810*e* correspond to the first location and the second location, respectively, and the nodes 810*b*, 810*c*, and 810*d* depicts the intermediate nodes. The recommended one or more routes are depicted by 810*a*→810*b*→810*c*→810*d*→810*e* and 810*a*→810*b*→810*d*→810*e*.

Figure 8B:
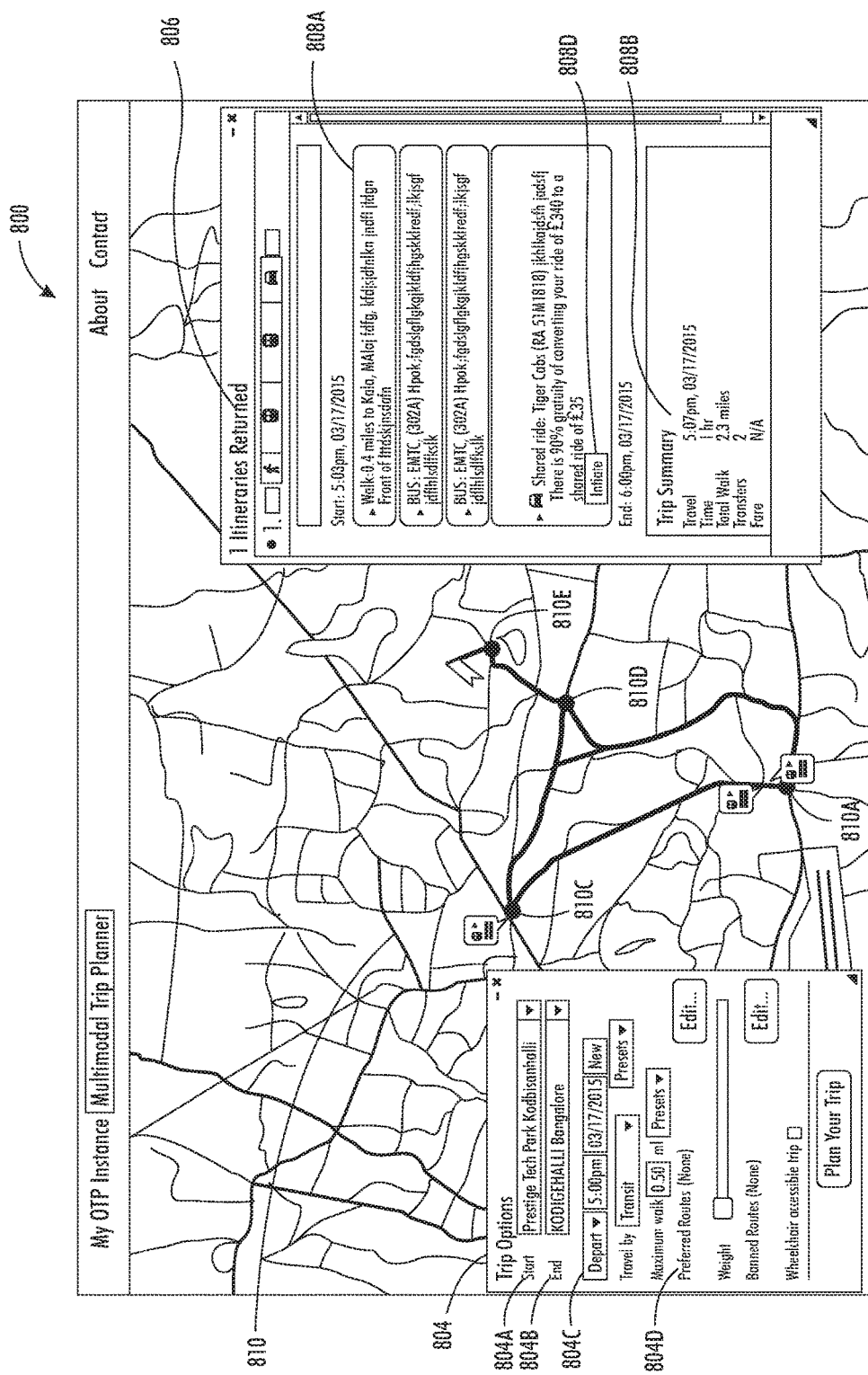

FIG. 8B illustrates the exemplary Graphical User Interface 800 presented on the user-computing device 102 in an event of unavailability of the pre-initiated pooled transportation service. FIG. 8*b* has been described in conjunction with FIG. 1, FIG. 2, FIG. 3, FIG. 4, FIG. 5, and FIG. 6.

Referring to FIG. 8B, the itinerary returned summary 808*a* may comprise an initiate button 808*d* to initiate a new-pooled transportation service. The itinerary returned summary 808*a* may further display the likelihood to find the one or more other users, for the new-pooled transportation service, on the one or more route. The new-pooled transportation service is identified for the last segment (depicted by 810*d*-810*e*) of the displayed routes (depicted by 810*a*→810*c*→810*d*→810*e* and 810*a*→810*d*→810*e*). In an embodiment, the itinerary returned summary 808*a* may further comprise the price information corresponding to the new-pooled transportation service initiated by the user, wherein the price information may further comprise the projected price of the new-pooled transportation service and the shared price of the new-pooled transportation service.

Figure 9:
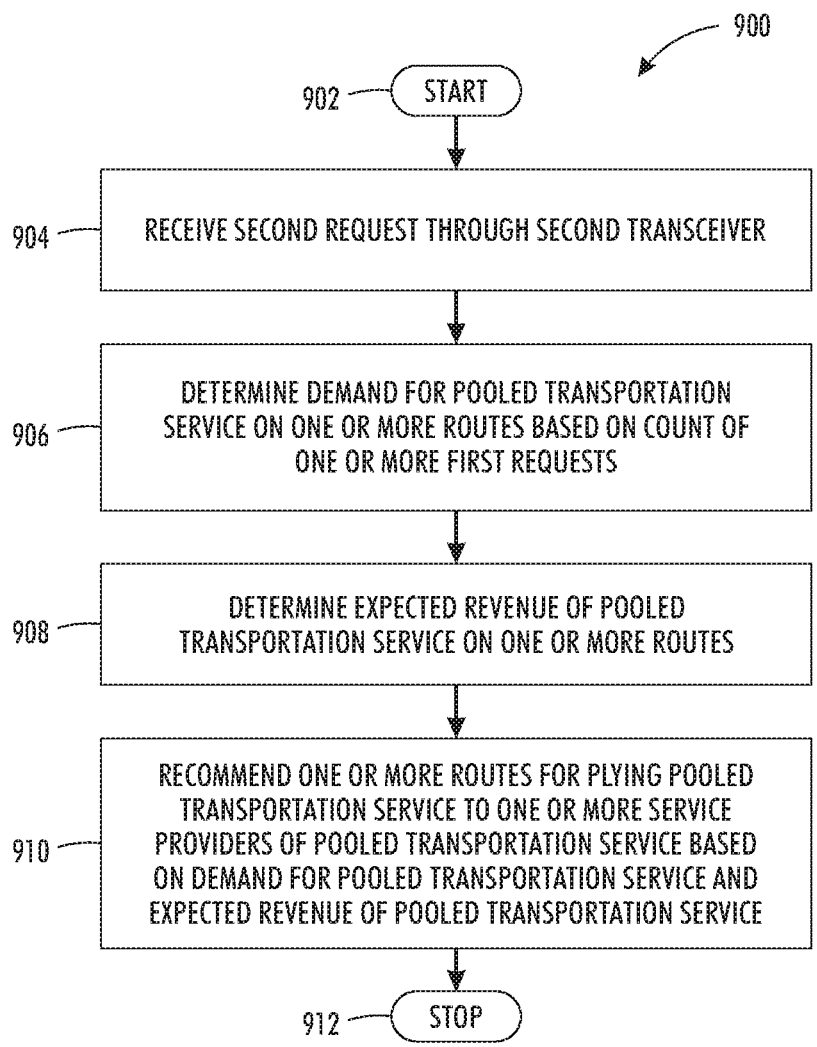
FIG. 9 is a flowchart illustrating a method for a demand-based recommendation of pooled transportation service, in accordance with at least one embodiment.

FIG. 9 is a flowchart 900 illustrating a method for a demand-based recommendation of pooled transportation service, in accordance with at least one embodiment. FIG. 9 has been described in conjunction with FIG. 1, FIG. 2, FIG. 3, FIG. 4, FIG. 5, and FIG. 6.

The method starts at step 902. At step 904, the second request from the agent-computing device 108 is received. In an embodiment, the second processor 402 may receive the second request through the second transceiver 406. In an embodiment, the second request may comprise information pertaining to the first location and the second location. In an embodiment, the service provider of the pooled transportation service associated with the agent-computing device 108 may transmit the second request to inquire about the one or more routes for plying the pooled transportation service.

At step 906, the demand for the pooled transportation service on the one or more routes, based on a count of the one or more first requests, is determined. In an embodiment, the route identification unit 408 may be configured to determine the demand for the pooled transportation service on the one or more routes, based on the count of the one or more first requests. To determine the demand for the pooled transportation service on the one or more routes the route identification unit 408 may retrieve the first requests by one or more users from the database server 106.

In an embodiment, the second transceiver 406 may be configured to receive the one or more first requests by the one or more users. In another embodiment, the second transceiver 406 may be configured to retrieve an information from the database server 106 pertaining to the count of the one or more first requests by the one or more users, in response to the second request transmitted by the agent-computing device 108. For instance, the second transceiver 406 receives eight first requests for a first route, and six first requests for a second route.

In an embodiment, the route identification unit 408 may determine the demand for the pooled transportation service on the one or more routes for a defined time window. In an embodiment, the defined time window may correspond to a current day (c). In another embodiment, the defined time window may correspond to a plurality of days, starting from the current day (c). In an exemplary scenario, the second transceiver 406 retrieves the count first requests over a first time period of $D_d$ days. In an embodiment, the $D_d$ days corresponds to the days prior to the current day. Further, the route-identification unit 408 may update the count of first requests received over a second time period of $D_p$ days. Further, the route-identification unit 408 may determine the demand for the pooled transportation service on a route in the one or more routes on the current day (c) based on the count of first requests received over the first time period of $D_d$ days, and the second time period of $D_p$ days. In an embodiment, the route-identification unit 408 may determine the demand for the pooled transportation service on the one or more routes using one or more state of the art algorithms, such as Auto Regressive Moving Average (ARMA) method, Auto Regressive Integrated Moving Average (ARIMA), Seasonal ARIMA, and the like. In an embodiment the route-identification unit 408 may determine the demand (r) for the pooled transportation service on the one or more routes by using equation 4 shown below:

$$r = \alpha + \varepsilon_c + \Sigma_{i=1}^{D_p} \varphi_i r_{c-i} + \Sigma_{i=1}^{D_d} \theta_i \varepsilon_{c-i} \quad (4)$$

where, $\varepsilon_k$ terms represent noise, and $\alpha$, $\theta_a$, and $\varphi_q$ are system parameters.

A person having ordinary skill in the art will understand that the abovementioned exemplary implementation for the determination of the demand for the pooled transportation service on the one or more routes has been provided for illustrative purposes and should not be construed to limit the scope of the disclosure.

At step 908, an expected revenue of the pooled transportation service on the one or more routes is determined. In an embodiment, the transportation-booking unit 412 may be configured to determine the expected revenue of the pooled transportation service on the one or more routes. The transportation-booking unit 412 may determine the expected revenue of the pooled transportation service based on the count of the one or more first requests.

At step 910, the one or more routes for plying the pooled transportation service are recommended to the one or more service providers of the pooled transportation service based on the demand for the pooled transportation service and the expected revenue of the pooled transportation service on the one or more routes. In an embodiment, the route identification unit 408 may recommend the one or more routes for plying the pooled transportation service to the one or more service providers of the pooled transportation service based on the demand for the pooled transportation service and the expected revenue of the pooled transportation service on the one or more routes. For example, a first route R1 has a demand 0.9 and an expected revenue of $40 per hour and a second route R2 has a demand 0.7 and an expected revenue of $30 per hour. In this scenario, the first route R1 is recommended to the service provider of the pooled transportation service.

In an embodiment, the second transceiver 406 may be configured to transmit the second notification to the agent-computing device 108 recommending the one or more routes for plying the pooled transportation service to the one or more service providers of the pooled transportation service.

A person having ordinary skill in the art will appreciate that the scope of the disclosure is not limited to recommend the one or more routes for plying the pooled transportation service to the one or more service providers of the pooled transportation service in response to the second request. In an embodiment, the transportation-booking unit 412 may automatically recommend the one or more routes for plying the pooled transportation service to the one or more service providers of the pooled transportation service based on the demand for the pooled transportation service and the expected revenue of the pooled transportation service on the one or more routes.

In an embodiment, prior to recommending the one or more routes to the service providers of the pooled transportation service the route-comparator unit 410 may rank the one or more routes. The route comparator unit 410 may rank the one or more routes based on one or more utility metrics associated with the one or more routes. In an embodiment the one or more utility metrics may comprise at least an average occupancy of the pooled transportation service or the expected revenue of the pooled transportation service on the one or more routes.

In an exemplary implementation, the route-identification unit 408 may use the shortest paths for the second request r, for determining the one or more routes to be recommended to the service provider. The transportation-booking unit 412 may use one or more state of the art algorithms, such as weighted interval scheduling algorithm and the like, 'cap' number of times, where cap is the maximum occupancy allowed for the pooled transportation service to determine the one or more routes, for plying the pooled transportation service, to be recommended to the service provider.

A person skilled in the art will understand that the abovementioned exemplary implementation, for recommending the one or more routes for plying the pooled transportation service to the service providers, has been provided for illustrative purposes and should not be construed to limit the scope of the disclosure. The method ends at step 912.

The disclosed embodiments encompasses numerous advantages. The method discloses a technique for transportation service recommendation between a first location and a second location. The disclosed methods and systems utilizes a combination of a public transportation service and a pooled transportation service for travelling on different segments of one or more routes during a trip. The disclosed method comprises a customization of available transportation services based on one or more route preferences and one or more transportation service preferences. Further, the disclosed method recommends a user to initiate a new-pooled transportation service by determining a likelihood to find one or more other users for a new-pooled transportation service, in an event of unavailability of pre-initiated pooled transportation service, thus solving a problem of large walking distances, during travelling, for a user. The disclosed system works in various modes providing different levels of customization of the trip to a user. Further, the disclosed method provides an intelligent recommendation of the one or more routes to service providers of the pooled transportation service based on a demand of the one or more routes by various users. Thus, the disclosed method gives an end-to-end solution to the user for planning a trip.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems of transportation service recommendation between the first location and the second location have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method of providing transportation service recommendation between a first location and a second location, the method comprising:

receiving, by one or more processors, a request from a user-computing device for transportation services between the first location and the second location at a specified time, the request including data for the first location that is automatically acquired by a positioning sensor included in the user-computing device, and data for the second location that is input by a user of the user-computing device;

determining, by the one or more processors, one or more recommended routes between the first location and the second location based on a maximum detour threshold and a maximum walking threshold, wherein each of the one or more recommended routes comprises a plurality of intermediate nodes;

receiving, by the one or more processors, real time data of traffic conditions on the one or more recommended routes from one or more sensors;

identifying, by the one or more processors, one or more transportation services for each recommended route based on a user profile, map data, historical data of traffic conditions along the recommended route, and the real time data of traffic conditions, wherein for each recommended route, a pre-initiated pooled transportation service is identified for at least a first pair of adjacent intermediate nodes, and a public transportation service is identified for at least a second pair of adjacent intermediate nodes;

transmitting, by the one or more processors, one or more transportation service recommendations to the user-computing device, wherein the one or more transportation service recommendations comprise the one or more recommended routes and the corresponding one or more transportation services; and rendering, by the user-computing device, a graphical user interface to display a map and the one or more transportation service recommendations, wherein the one or more transportation service recommendations include the recommended routes and are displayed based on a ranking score, wherein the graphical user interface comprises user interface elements that are engageable by the user to select a transportation service recommendation, and wherein determining the one or more recommended routes comprises:

generating a weighted graph based on the maximum detour threshold and the maximum walking threshold, the weighted graph including the intermediate nodes represented by squares each having a length corresponding to a lower one of the maximum detour threshold and the maximum walking threshold, the weighted graph also including edges connecting the intermediate nodes, wherein the edges representing geographical distances between the intermediate nodes;

determining a plurality of shortest paths between a source node corresponding to the first location and a destination node corresponding to the second location based on lengths of paths and average time of travel for the paths, wherein a length of a path is determined based on a sum of lengths of edges included in the path connecting the source node and the destination node; and identifying the one or more recommended routes based on the plurality of shortest paths and at least one of the maximum detour threshold and the maximum walking threshold.

2. The method according to claim 1, further comprising ranking, by the one or more processors, the one or more transportation service recommendations based on one or more route parameters associated with each of the one or more recommended routes, one or more transportation service parameters associated with each of the one or more transportation services on the one or more recommended routes, and the user profile.

3. The method according to claim 2, wherein the one or more route parameters comprise at least a number of intermediate legs in the one or more recommended routes, a distance of a walking leg in the one or more recommended routes, or a detour distance from a shortest path between the first location and the second location in the one or more recommended routes.

4. The method according to claim 2, wherein the one or more transportation service parameters comprise at least a travel time information, and a price charged by the corresponding one or more transportation services.

5. The method according to claim 1, wherein the user profile comprises at least one or more route preferences and one or more transportation service preferences.

6. The method according to claim 5, wherein the one or more route preferences comprise at least a preference of the recommended route between the first location and the second location, a maximum number of intermediate hops between the first location and the second location, a maximum detour threshold, or a maximum walking threshold.

7. The method according to claim 6, wherein the one or more transportation service preferences comprise at least a preference of a transportation service, a preference of make of the transportation service, a maximum occupancy of pooled transportation service, a preference of co-passengers in the pooled transportation service, and a cost constraint.

8. The method according to claim 1, further comprising receiving a selection, by the one or more processors, of a transportation service recommendation from the one or more transportation service recommendations, wherein the pre-initiated pooled transportation service or a new-pooled transportation service is booked based on the received selection.

9. The method according to claim 8, further comprising transmitting a notification to an agent-computing device associated with the booked pooled transportation service, wherein the notification comprises one or more of details pertaining to at least a pick up node of the first pair of adjacent intermediate nodes, and details pertaining to the user.

10. The method according to claim 1, further comprising determining on arrival time of the pre-initiated pooled transportation service or a new-pooled transportation service at a pick up node of the first pair of adjacent intermediate nodes based at least on a current location of the pre-initiated pooled transportation service or the new-pooled transportation service, and a speed of the pre-initiated pooled transportation service or the new-pooled transportation service, wherein the one or more transportation service recommendations are based on the determination of the arrival time of the pre-initiated pooled transportation service or the new-pooled transportation service.

11. The method according to claim 1, further comprising recommending, by the one or more processors, the one or more recommended routes to one or more service providers of the pooled transportation service based on demand on each of the one or more recommended routes, wherein the demand corresponds to a count of first requests received from one or more users for transportation service recommendations between the first location and the second location.

12. A system for providing transportation service recommendation between a first location and a second location, the system comprising:
one or more sensors configured to obtain real time data of traffic conditions; and
one or more processors configured to:
receive a request from a user-computing device for transportation services between the first location and the second location at a specified time, the request including data for the first location that is automatically acquired by a positioning sensor included in the user-computing device, and data for the second location that is input by a user of the user-computing device;
determine one or more recommended routes between the first location and the second location based on a maximum detour threshold and a maximum walking threshold, wherein each of the one or more recommended routes comprises a plurality of intermediate nodes;
identify one or more transportation services for each recommended route based on a user profile, map data, historical data of traffic conditions along the route, and the real time data of traffic conditions along the route,
wherein for each recommended route, a pre-initiated pooled transportation service is identified for at least a first pair of adjacent intermediate nodes, and a public transportation service is identified for at least a second pair of adjacent intermediate nodes;
transmit one or more transportation service recommendations to the user through the user-computing device, wherein the one or more transportation service recommendations comprise the one or more recommended routes and the corresponding one or more transportation services; and
render, by the user-computing device, a graphical user interface to display a map and the one or more transportation service recommendations, wherein the one or more transportation service recommendations including the recommended routes and are displayed based on a ranking score,
wherein the graphical user interface comprises user interface elements that are engageable by the user to select a transportation service recommendation, and
wherein determining the one or more recommended routes comprises:
generating a weighted graph based on the maximum detour threshold and the maximum walking threshold, the weighted graph including the intermediate nodes represented by squares each having a length corresponding to a lower one of the maximum detour threshold and the maximum walking threshold, the weighted graph also including edges connecting the intermediate nodes, wherein the edges representing geographical distances between the intermediate nodes; and
determining a plurality of shortest paths between a source node corresponding to the first location and a destination node corresponding to the second location based on lengths of paths and average time of travel for the paths, wherein a length of a path is determined based on a sum of lengths of edges included in the path connecting the source node and the destination node; and
identifying the one or more recommended routes based on the plurality of shortest paths, and at least one of the maximum detour threshold and the maximum walking threshold.

13. The system according to claim 12, wherein the one or more processors are configured to rank the one or more transportation service recommendations based on one or more route parameters associated with each of the one or more recommended routes, one or more transportation service parameters associated with each of the one or more transportation services on the one or more recommended routes, and the user profile.

14. The system according to claim 13, wherein the one or more route parameters comprise at least a number of intermediate legs in the one or more recommended routes, a distance of a walking leg in the one or more recommended routes, or a detour distance from a shortest path between the first location and the second location in the one or more recommended routes.

15. The system according to claim 13, wherein the one or more transportation service parameters comprise at least a travel time information, and a price charged by the corresponding one or more transportation services.

16. The system according to claim 12, wherein the user profile comprises at least one or more route preferences and one or more transportation service preferences.

17. The system according to claim 16, wherein the one or more route preferences comprise at least a preference of the recommended route between the first location and the second location, a maximum number of intermediate hops between the first location and the second location, a maximum detour threshold, or a maximum walking threshold.

18. The system according to claim 16, wherein the one or more transportation service preferences comprise at least a preference of a transportation service, a preference of make of the transportation service, a maximum occupancy of pooled transportation service, a preference of co-passengers in the pooled transportation service, and a cost constraint.

19. The system according to claim 12, wherein the one or more processors ore further configured to receive a selection of a transportation service recommendation from the one or more transportation service recommendations, wherein the pre-initiated pooled transportation service or a new-pooled transportation service is booked based on the received selection.

20. The system according to claim 19, wherein the one or more processors are further configured to transmit a notification to an agent-computing device associated with the booked pooled transportation service, wherein the notification comprises one or more of details pertaining to at least a pick up node of the first pair of adjacent intermediate nodes, and details pertaining to the user.

21. The system according to claim 12, wherein the one or more processors are further configured to determine an arrival time of the pre-initiated pooled transportation service or a new-pooled transportation service at a pick up node of the first pair of adjacent intermediate nodes based at least on a current location of the pre-initiated pooled transportation service or the new-pooled transportation service, and a speed of the pre-initiated pooled transportation service or the new-pooled transportation service, wherein the one or more recommended routes are recommended based on the determination of the arrival time of the pre-initiated pooled transportation service or the new-pooled transportation service.

22. The system according to claim 12, wherein the one or more processors ore further configured to recommend the one or more recommended routes to one or more service providers of the pooled transportation service based on demand on each of the one or more recommended routes, wherein the demand corresponds to a count of first requests received from one or more users for transportation service recommendations between the first location and the second location.

23. A computer program product for use with a computer, the computer program product comprising a non-transitory computer readable medium, wherein the non-transitory computer readable medium stores a computer program code for providing transportation service recommendation between a first location and a second location, wherein the computer program code is executable by one or more processors to:
receive a request from a user-computing device for transportation services between the first location and the second location at a specified time, the request including data for the first location that is automatically acquired by a positioning sensor included in the user-computing device, and data for the second location that is input by a user of the user-computing device;
determine one or more recommended routes between the first location and the second location based on a maximum detour threshold and a maximum walking threshold, wherein each of the one or more recommended routes comprise a plurality of intermediate nodes;
receive real time data of traffic conditions on the one or more recommended routes from one or more sensors;
identify one or more transportation services for each recommended route based on a user profile, map data, historical data of traffic conditions along the route, and the real time data of traffic conditions,
wherein for each recommended route, a pre-initiated pooled transportation service is identified for at least a first pair of adjacent intermediate nodes, and a public transportation service is identified for at least a second pair of adjacent intermediate nodes;
transmit one or more transportation service recommendations to the user through the user-computing device, wherein the one or more transportation service recommendations comprise the one or more recommended routes and the corresponding one or more transportation services; and
render, by the user-computing device, a graphical user interface to display a map and the one or more transportation service recommendations, wherein the one or more transportation service recommendations including the recommended routes and are displayed based on a ranking score,
wherein the graphical user interface comprises user interface elements that are engageable by the user to select a transportation service recommendation, and
wherein determining the one or more recommended routes comprises:
generating a weighted graph based on the maximum detour threshold and the maximum walking threshold, the weighted graph including the intermediate nodes represented by squares each having a length corresponding to a lower one of the maximum detour threshold and the maximum walking threshold, the weighted graph also including edges connecting the intermediate nodes, wherein the edges representing geographical distances between the intermediate nodes;
determining a plurality of shortest paths between a source node corresponding to the first location and a destination node corresponding to the second location based on lengths of paths and average time of travel for the paths, wherein a length of a path is determined based on a sum of lengths of edges included in the path connecting the source node and the destination node; and
identifying the one or more recommended routes based on the plurality of shortest paths, and at least one of the maximum detour threshold and the maximum walking threshold.

* * * * *